United States Patent
Siomina et al.

(10) Patent No.: US 11,838,175 B2
(45) Date of Patent: Dec. 5, 2023

(54) ADAPTION OF REFERENCE SIGNAL MUTING CONFIGURATION

(71) Applicant: TELEFONAKTIEBOLAGET LM ERICSSON (PUBL), Stockholm (SE)

(72) Inventors: Iana Siomina, Täby (SE); Muhammad Kazmi, Sundbyberg (SE); Kazuyoshi Uesaka, Kawasaki Kanagawa (JP)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 391 days.

(21) Appl. No.: 17/290,464

(22) PCT Filed: Nov. 4, 2019

(86) PCT No.: PCT/IB2019/059457
§ 371 (c)(1),
(2) Date: Apr. 30, 2021

(87) PCT Pub. No.: WO2020/089880
PCT Pub. Date: May 7, 2020

(65) Prior Publication Data
US 2022/0038334 A1     Feb. 3, 2022

Related U.S. Application Data

(60) Provisional application No. 62/755,092, filed on Nov. 2, 2018, provisional application No. 62/755,010, filed on Nov. 2, 2018.

(51) Int. Cl.
*H04L 41/0803* (2022.01)
*H04L 5/00* (2006.01)

(52) U.S. Cl.
CPC ........ *H04L 41/0803* (2013.01); *H04L 5/0048* (2013.01); *H04L 5/0078* (2013.01)

(58) Field of Classification Search
None
See application file for complete search history.

(56) References Cited

U.S. PATENT DOCUMENTS 10,104,671 B2   10/2018   Chakraborty

FOREIGN PATENT DOCUMENTS

| EP | 2066043 B1 | 8/2011 |
| RU | 2556241 C2 | 7/2015 |
| RU | 2630179 C2 | 9/2017 |
| WO | 2010031725 A1 | 3/2010 |
| WO | 2014053076 A1 | 4/2014 |

(Continued)

OTHER PUBLICATIONS

Search Report issued on corresponding RU Application RU202111561 dated Dec. 23, 2021.

(Continued)

*Primary Examiner* — Brian S Roberts
(74) *Attorney, Agent, or Firm* — Ericsson Inc.

(57) ABSTRACT

Systems and methods for determining and using a reference signal muting configuration are provided. A network can configure a muting configuration for a first reference signal in accordance with determining if the first reference signal is used by a wireless device for operating a channel. The first reference signal can be transmitted in accordance with the muting configuration and used by the wireless device to perform an operation.

24 Claims, 15 Drawing Sheets

(56) References Cited

FOREIGN PATENT DOCUMENTS

| WO | 2016076782 A1 | 5/2016 | | |
|---|---|---|---|---|
| WO | 2018175571 A1 | 9/2018 | | |
| WO | WO-2019032233 A1 | * | 2/2019 | ............... H04L 5/00 |
| WO | WO-2019032868 A1 | * | 2/2019 | ............. H04L 5/005 |
| WO | WO-2020033648 A1 | * | 2/2020 | ........... H04J 11/0073 |

OTHER PUBLICATIONS

Ericsson, "New LTE WI on UE requirements for network-based CRS mitigation", 3GPP TSG RAN Meeting #76, RP-171408, West Palm Beach, USA, Jun. 5-8, 2017.

Huawei, et al., "Remaining on the warm-up and cool-down of network-based CRS IM", 3GPP TSG-RAN WG4 Meeting #88, R4-1810639, Gothenburg, Sweden, Aug. 20-24, 2018.

Qualcomm Incorporated, "Discussion on the remaining open issues in the network-based CRS interference mitigation", 3GPP TSG-RAN WG4 Meeting #88, R4-1810544, Gothenburg, Sweden, Aug. 20-24, 2018.

International Search Report and Written Opinion issued on applicant's corresponding PCT application PCT/I82019/059457 pp. 1-15.

* cited by examiner

Figure 7

ADAPTION OF REFERENCE SIGNAL MUTING CONFIGURATION

CROSS REFERENCE TO RELATED APPLICATIONS

This application claims the benefit of U.S. Provisional Application No. 62/755,010 filed on Nov. 2, 2019 and U.S. Provisional Application No. 62/755,092 filed on Nov. 2, 2019, the entire contents of which are hereby incorporated by reference.

TECHNICAL FIELD

The present disclosure generally relates to wireless communications and wireless communication networks.

INTRODUCTION

In Long Term Evolution (LTE) networks, the Cell-specific Reference Signals (CRSs) are transmitted by the base station (BS) (e.g. a radio access node, eNB, gNB) using full system bandwidth in all downlink (DL) subframes in a radio frame. A CRS can be used by the user equipment (UE) for several procedures. Examples of such procedures are time and/or frequency tracking or synchronization, channel estimation, radio link quality measurements, cell selection, cell reselection, etc.

However, CRSs are not used by the UE all the time. The continuous CRS transmission with full system bandwidth (BW) in one cell may cause interference at a UE operating in neighboring cell. The CRS transmission also consumes base station power. In one example the CRS can be muted in a cell during UE inactive time (e.g. OFF duration) of the Discontinuous Reception (DRX) cycle while CRS are transmitted over full BW during UE active time (e.g. ON duration) of the DRX cycle.

Conventional 3GPP standards define the active (T1) and inactive time (T2) periods and warm-up (N1) and cool-down (N2) periods as follows:

CRS is transmitted over full bandwidth of the cell during active time periods (T1) and over at least 6 central resource blocks of the cell during the inactive time periods (T2), and CRS is transmitted over full bandwidth of the cell during at least N1 number of non-MBSFN non-special DL subframes immediately before the T1 time period, and CRS is transmitted over full bandwidth of the cell during at least N2 number of DL subframes after the T1 time period when UE receives the downlink physical channel during the T1 time period, where the active time period T1 at least includes any period of the time where UE monitors/receives the downlink physical channels or signals, or UE transmits the uplink physical channels or signals.

The values of the parameters T1, T2, N1 and N2 are specified in the UE requirements or can be requested by a UE or indicated by the network. From the cell perspective, the inactive time periods T2 shall not contain any subframe where at least one UE requires CRS over the full cell bandwidth for any purpose to meet the requirements in 3GPP TS 36.133. The values of T1, N1, N2, and T2 can further be associated with the DRX cycle configuration used in the cell, e.g., T1 can comprise in DRX ON duration and can periodically occur with the DRX cycle periodicity.

FIG. 1 illustrates one example of CRS muting operation, where "muted CRS" refers to transmission of CRS using reduced CRS bandwidth (e.g. over central 6 RBs within cell BW) during an inactive time of the DRX cycle, excluding warm-up (WU) and cool-down (CD) periods. The warm up and cool down periods typically occur during the UE inactive time and during which CRS is transmitted over full BW of the cell or over a larger bandwidth than with the reduced CRS bandwidth operation. For UEs not supporting full BW operation (e.g., eFeMTC UE Cat M1 or UE Cat M2), the CRS need to be ensured over the part of the cell bandwidth where the UE reception is configured or within the UE RF bandwidth. The WU period(s) occur before the active time of the DRX while the CD period(s) occur after the active time of the DRX as shown in FIG. 1. As a special case, warmup and/or cool down periods can be zero. During at least the active time of the DRX, the CRS are transmitted over full bandwidth or larger bandwidth. This is also called as lean carrier operation or RS muting or CRS muting etc. The lean carrier operation is applied when DRX and/or eDRX cycle is used.

In some cases, a cell in lean carrier operational mode can transmit the RS over full bandwidth over at least a time period Ts (e.g. over Nc number of time resources) with a certain periodicity (Tc). The parameters Ts and Tc can be: pre-defined, can be configured in the cell by a network node (e.g. core network node, another radio network node, etc.) and/or can be configured based on a request or recommendation received from one or more UEs. The value of Tc and/or Ts can further be associated with occurrence of a particular signal, operation, procedure, etc.

FIG. 2 illustrates an example of DRX. The DRX configuration herein may also be an enhanced or extended DRX (eDRX) configuration. In conventional DRX related procedures, the UE can be configured with DRX cycle length of up to 2.56 seconds. But UEs supporting extended DRX (eDRX) can be configured with a DRX cycle at least longer than 2.56 seconds and typically much longer than 2.56 seconds (i.e. in order of several seconds to several minutes). The eDRX configuration parameters include an eDRX cycle length, paging window length aka paging time window (PTW) length, etc. Within a PTW of the eDRX, the UE is further configured with one or more legacy DRX cycles.

The values of Tc and/or Ts can further be associated with the DRX cycle configuration used in cell1. As an example, Tc can be a DRX period while Ts can be a DRX ON duration. The UE has an opportunity for power saving during DRX OFF, i.e. time period with opportunity for DRX in FIG. 2.

In LTE, the BS transmits the pre-defined signal to UEs, and this signal is referred to as the "reference signal". A UE can use the reference signal for several purposes. One example is channel estimation, which gives information how the transmitted signals are changed over the air between BS transmitter and UE receiver (e.g., phase shift, amplitude change). When UE demodulates the target channel (e.g., PCFICH, PDCCH, PDSCH, etc.), UE uses the channel estimation information to compensate the received signal. Another example is the channel analysis. The UE can estimate the channel characteristics such as channel delay spread, channel path delay profile, and Doppler spread. This channel information can be used to estimate the receiver mobility status (e.g. UE is moving or stationary) or to optimize the receiver algorithm. Yet another example is the frequency/time tracking. Since the BS and UE operate with the different timing generator (e.g., PLL, oscillator, clock), the timing of UE could be drifted from BS over time. Since it is important to ensure the UE is well synchronized with the BS to ensure the reliable communication, the UE uses CRS to estimate the timing/frequency error from the BS and compensate it. For example, after the long sleep in (e)DRX, the reception timing of UE could be much different from BS transmission timing. In this case, it spends longer time (e.g., 8 subframes) to compensate the large timing error.

There are two types of reference signals: common reference signals and dedicated reference signals. Common reference signals are intended to be used by any UEs connected to a BS. In LTE, there are several common reference signals: cell-specific reference signals (CRS) and positioning reference signals (PRS). Since the BS does not know when which UE wants to receive the common reference signals, the BS needs to transmit CRS all the time. PRS are not transmitted in every DL subframe, but periodically with up to 1.28 seconds periodicity and the exact PRS configuration is provided to the UE by the location server for each of up to 16 cells to be measured for positioning. A number of neighbor cells the UE needs to measure for positioning and rather static configuration of positioning signals are some reasons for PRS to be common signals. Since a UE expects that CRS is always available, UE usually uses CRS for channel analysis or time/frequency tracking, as well as channel estimation for demodulation.

The dedicated reference signals are intended to be used by a certain UE(s). When the BS transmits dedicated reference signals, the BS first needs to indicate the target UE to use the dedicated reference signals instead of common reference signals. An example of dedicated signals is demodulation reference signal (DMRS) or channel state information reference signal (CSI-RS). An advantage of dedicated reference signal compared with the common reference signal is the BS can tune to the target UE. One example is beam forming where the BS adjusts the amplitude and phase of a reference signal to direct to the target UE. Another advantage is the BS adjusts the amount to transmit reference signals. For example, a fast-moving UE may need frequent reference signal transmission in time domain to track the frequency shift. On the other hand, a stationary UE may need less frequent reference signals in time domain. To use the dedicated reference signals, a UE needs the dedicated reference signal configuration such as signal sequence, transmitted location, transmitted timing.

Therefore, the purpose of dedicated reference signals is somewhat limited. For example, DMRS is intended to be used for the demodulation of associated channel (e.g., PDSCH, EPDCCH, MPDCCH, SPDCCH, Slot/Subslot-PDSCH, etc.). Moreover, DMRS is only transmitted during the time where those associated channels are transmitted.

SUMMARY

It is an object of the present disclosure to obviate or mitigate at least one disadvantage of the prior art.

There are provided systems and methods for determining and using a RS muting configuration in accordance with the type of RS used for channel reception.

In a first aspect, there is provided a method performed by a network node. The method includes determining if a first reference signal is used by a wireless device for operating a channel. The network node configures a muting configuration for the first reference signal, including one of: determining a first number of at least one of warm-up and cool-down time resources responsive to determining that the first reference signal is used for operating the channel, and determining a second number of at least one of warm-up and cool-down time resources responsive to determining that a second reference signal is used for operating the channel. The network node transmits the first reference signal in accordance with the configured muting configuration.

In another aspect there is provided a network node comprising a radio interface and processing circuitry. The network node is configured to determine if a first reference signal is used by a wireless device for operating a channel. The network node configures a muting configuration for the first reference signal, including one of: determining a first number of at least one of warm-up and cool-down time resources responsive to determining that the first reference signal is used for operating the channel, and determining a second number of at least one of warm-up and cool-down time resources responsive to determining that a second reference signal is used for operating the channel. The network node transmits the first reference signal in accordance with the configured muting configuration.

In some embodiments, the network node can further determine a reference signal type of the first reference signal and/or a reference signal type of the second reference signal. The reference signal type can be one of Cell-specific Reference Signal (CRS), Demodulation Reference Signal (DMRS), and Channel State Information Reference Signal (CSI-RS).

In some embodiments, the network node can configure a second muting configuration for the first reference signal responsive to determining that the first reference signal is used for a preparatory operation associated with the channel.

In some embodiments, the network node can further determine the number of the at least one of warm-up and cool-down time resources in accordance with a position of reception of the channel within a subframe. Some embodiments include, responsive to determining the position of reception of the channel is in a later part of the subframe, decreasing the number of warm-up time resources. Some embodiments include, responsive to determining the position of reception of the channel is in a later part of the subframe, increasing the number of cool-down time resources. Some embodiments include, responsive to determining the position of reception of the channel is in an earlier part of the subframe, increasing the number of warm-up time resources. Some embodiments include, responsive to determining the position of reception of the channel is in an earlier part of the subframe, decreasing the number of cool-down time resources.

In another aspect there is provided a method performed by a wireless device. The method includes obtaining a muting configuration for a first reference signal. The muting configuration includes an indication of one of: a first number of at least one of warm-up and cool-down time resources responsive to determining that the first reference signal is used for operating a channel, and a second number of at least one of warm-up and cool-down time resources responsive to determining that a second reference signal is used for operating the channel. The wireless device receives the first reference signal in accordance with the muting configuration; and uses the first reference signal for performing at least one operation.

In another aspect there is provided a wireless device comprising a radio interface and processing circuitry. The wireless device is configured to obtain a muting configuration for a first reference signal. The muting configuration includes an indication of one of: a first number of at least one of warm-up and cool-down time resources responsive to determining that the first reference signal is used for operating a channel, and a second number of at least one of warm-up and cool-down time resources responsive to determining that a second reference signal is used for operating the channel. The wireless device is configured to receive the first reference signal in accordance with the muting configuration; and to use the first reference signal for performing at least one operation.

In some embodiments, the wireless device further determines a reference signal type of at least one of the first reference signal and/or the second reference signal. In some embodiments, the muting configuration can be further configured in accordance with the determined reference signal type.

In some embodiments, the wireless device further determines a position of reception of the channel within a subframe. In some embodiments, the muting configuration can be further configured in accordance with the determined position of reception of the channel with the subframe.

The various aspects and embodiments described herein can be combined alternatively, optionally and/or in addition to one another.

Other aspects and features of the present disclosure will become apparent to those ordinarily skilled in the art upon review of the following description of specific embodiments in conjunction with the accompanying figures.

BRIEF DESCRIPTION OF THE DRAWINGS

Embodiments of the present disclosure will now be described, by way of example only, with reference to the attached Figures, wherein:

FIG. 7 illustrates an example slot index.

DETAILED DESCRIPTION

Figure 1:
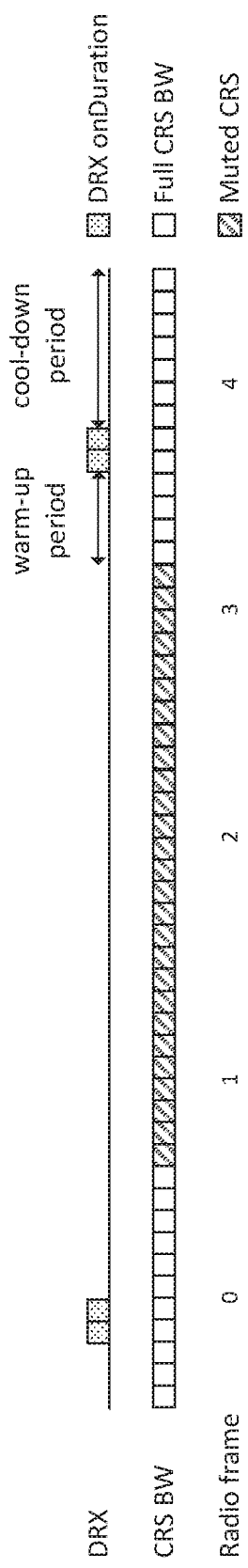
FIG. 1 illustrates an example of CRS muting operation.
Figure 2:
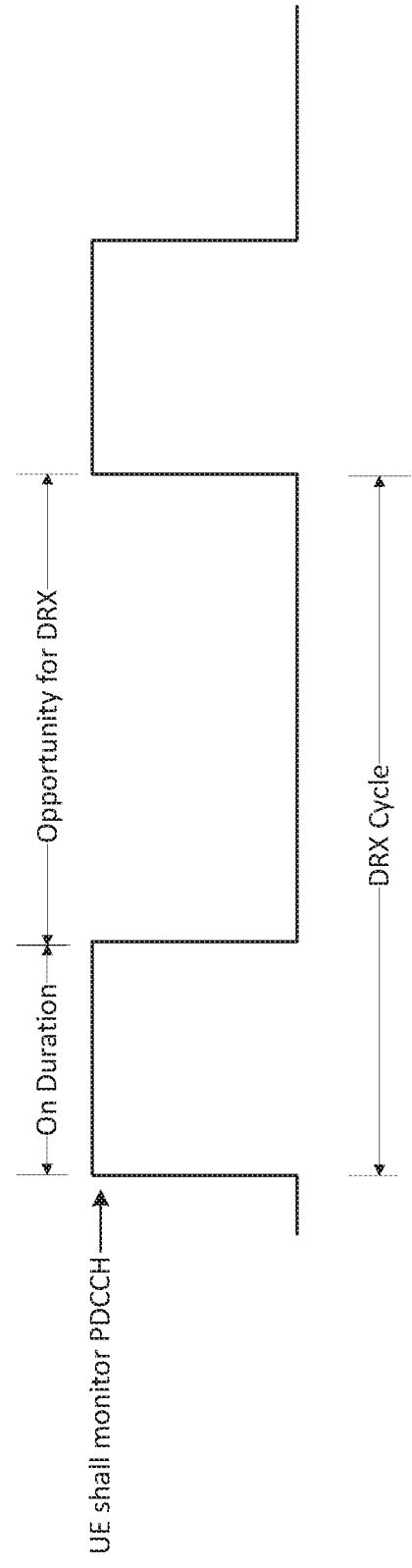
FIG. 2 illustrates an example DRX cycle operation.

The embodiments set forth below represent information to enable those skilled in the art to practice the embodiments. Upon reading the following description in light of the accompanying drawing figures, those skilled in the art will understand the concepts of the description and will recognize applications of these concepts not particularly addressed herein. It should be understood that these concepts and applications fall within the scope of the description.

In the following description, numerous specific details are set forth. However, it is understood that embodiments may be practiced without these specific details. In other instances, well-known circuits, structures, and techniques have not been shown in detail in order not to obscure the understanding of the description. Those of ordinary skill in the art, with the included description, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

In some embodiments, the non-limiting term "user equipment" (UE) is used and it can refer to any type of wireless device which can communicate with a network node and/or with another UE in a cellular or mobile or wireless communication system. Examples of UE are target device, device to device (D2D) UE, machine type UE or UE capable of machine to machine (M2M) communication, personal digital assistant, tablet, mobile terminal, smart phone, laptop embedded equipped (LEE), laptop mounted equipment (LME), USB dongles, ProSe UE, V2V UE, V2X UE, MTC UE, eMTC UE, FeMTC UE, UE Cat 0, UE Cat M1, narrow band IoT (NB-IoT) UE, UE Cat NB1, etc. Example embodiments of a UE are described in more detail below with respect to FIG. 13.

In some embodiments, the non-limiting term "network node" is used and it can correspond to any type of radio access node (or radio network node) or any network node, which can communicate with a UE and/or with another network node in a cellular or mobile or wireless communication system. Examples of network nodes are NodeB, MeNB, SeNB, a network node belonging to MCG or SCG, base station (BS), multi-standard radio (MSR) radio access node such as MSR BS, eNodeB, network controller, radio network controller (RNC), base station controller (BSC), relay, donor node controlling relay, base transceiver station (BTS), access point (AP), transmission points, transmission nodes, RRU, RRH, nodes in distributed antenna system (DAS), core network node (e.g. MSC, MME, etc.), O&M, OSS, Self-organizing Network (SON), positioning node (e.g. E-SMLC), MDT, test equipment, etc. Example embodiments of a network node are described in more detail below with respect to FIG. 15.

In some embodiments, the term "radio access technology" (RAT) refers to any RAT e.g. UTRA, E-UTRA, narrow band internet of things (NB-IoT), WiFi, Bluetooth, next generation RAT (NR), 4G, 5G, etc. Any of the first and the second nodes may be capable of supporting a single or multiple RATs.

The term "radio node" used herein can be used to denote a wireless device or a network node.

In some embodiments, a UE can be configured to operate in carrier aggregation (CA) implying aggregation of two or more carriers in at least one of downlink (DL) and uplink (UL) directions. With CA, a UE can have multiple serving cells, wherein the term 'serving' herein means that the UE is configured with the corresponding serving cell and may receive from and/or transmit data to the network node on the serving cell e.g. on PCell or any of the SCells. The data is transmitted or received via physical channels e.g. PDSCH in DL, PUSCH in UL, etc. A component carrier (CC) also interchangeably called as carrier or aggregated carrier, PCC or SCC is configured at the UE by the network node using higher layer signaling e.g. by sending RRC configuration message to the UE. The configured CC is used by the network node for serving the UE on the serving cell (e.g. on PCell, PSCell, SCell, etc.) of the configured CC. The configured CC is also used by the UE for performing one or more radio measurements (e.g. RSRP, RSRQ, etc.) on the cells operating on the CC, e.g. PCell, SCell or PSCell and neighboring cells.

In some embodiments, a UE can also operate in dual connectivity (DC) or multi-connectivity (MC). The multi-carrier or multicarrier operation can be any of CA, DC, MC, etc. The term "multicarrier" can also be interchangeably called a band combination.

The term "radio measurement" used herein may refer to any measurement performed on radio signals. Radio measurements can be absolute or relative. Radio measurements can be e.g. intra-frequency, inter-frequency, CA, etc. Radio measurements can be unidirectional (e.g., DL or UL or in either direction on a sidelink) or bidirectional (e.g., RTT, Rx-Tx, etc.). Some examples of radio measurements: timing measurements (e.g., propagation delay, TOA, timing advance, RTT, RSTD, Rx-Tx, etc.), angle measurements (e.g., angle of arrival), power-based or channel quality measurements (e.g., path loss, received signal power, RSRP, received signal quality, RSRQ, SINR, SNR, interference power, total interference plus noise, RSSI, noise power, CSI, CQI, PMI, etc.), cell detection or cell identification, RLM, SI reading, etc. The measurement may be performed on one or more links in each direction, e.g., RSTD or relative RSRP or based on signals from different transmission points of the same (shared) cell.

The term "bandwidth" (BW) used herein refers to a range of frequencies over which a node transmits signals to and/or receives signal from another node. The term BW is interchangeably called operating bandwidth, channel bandwidth, system bandwidth, configured bandwidth, transmission bandwidth, cell bandwidth, cell transmission BW, carrier bandwidth, etc. The BW can be expressed in any one of the following: G1 MHz, G2 GHz, in in terms of number of physical channels (e.g. G3 resource blocks, G4 subcarriers, etc.). In one example, the BW can include guard band while in another example the BW can exclude guard band. For example, system or channel BW can include guard band while transmission bandwidth consists of BW without guard band.

The term "signaling" used herein may comprise any of: high-layer signaling (e.g., via RRC or a like), lower-layer signaling (e.g., via a physical control channel or a broadcast channel), or a combination thereof. The signaling may be implicit or explicit. The signaling may further be unicast, multicast or broadcast. The signaling may also be directly to another node or via a third node.

The term signal used herein may comprise any physical signal or physical channel. An example of a physical signal is a reference signal (RS). The RS used herein may correspond to any type of physical signal pre-configured in the UE, e.g. signal or associated sequence known to the UE. Examples of RS are CRS, DMRS, MBSFN RS, CSI-RS, PSS/SSS, NRS, NPSS, NSSS, PRS, TRS, PT-RS, signals in SSB (e.g. NR PSS, NR SSS, NR DMRS etc). The term physical channel (e.g., in the context of channel reception) used herein is also called "channel". The channel can contain higher layer information e.g. PBCH containing MIB, PDSCH containing one or more SIBs, etc. Examples of physical channels are PBCH, NPBCH, PDCCH, PDSCH, sPUCCH, sPDSCH, MPDCCH, NPDCCH, NPDSCH, E-PDCCH, PUSCH, PUCCH, NPUSCH, PRACH, NPRACH, etc.

The term "time resource" used herein may correspond to any type of physical resource or radio resource expressed in terms of length of time. Examples of time resources include: symbol, time slot, sub-frame, radio frame, TTI, interleaving time, etc. The term "frequency resource" may refer to sub-band within a channel bandwidth, subcarrier, carrier frequency, frequency band. The term "time and frequency resources" may refer to any combination of time and frequency resources. The term "TTI" used herein may correspond to any time period (T0) over which a physical channel can be encoded and optionally interleaved for transmission. The physical channel is decoded by the receiver over the same time period (T0) over which it was encoded. The TTI may comprise one or more symbols. The TTI may also interchangeably called as short TTI (sTTI), transmission time, time slot, sub-slot, mini-slot, mini-subframe, etc.

Some examples of UE operation include: UE radio measurement (see the term "radio measurement" above), bidirectional measurement with UE transmitting, cell detection or identification, beam detection or identification, system information reading, channel receiving and decoding, any UE operation or activity involving at least receiving of one or more radio signals and/or channels, cell change or (re)selection, beam change or (re)selection, a mobility-related operation, a measurement-related operation, a radio resource management (RRM)-related operation, a positioning procedure, a timing related procedure, a timing adjustment related procedure, UE location tracking procedure, time tracking related procedure, synchronization related procedure, MDT-like procedure, measurement collection related procedure, a CA-related procedure, serving cell activation/deactivation, CC configuration/de-configuration, etc.

Figure 3:
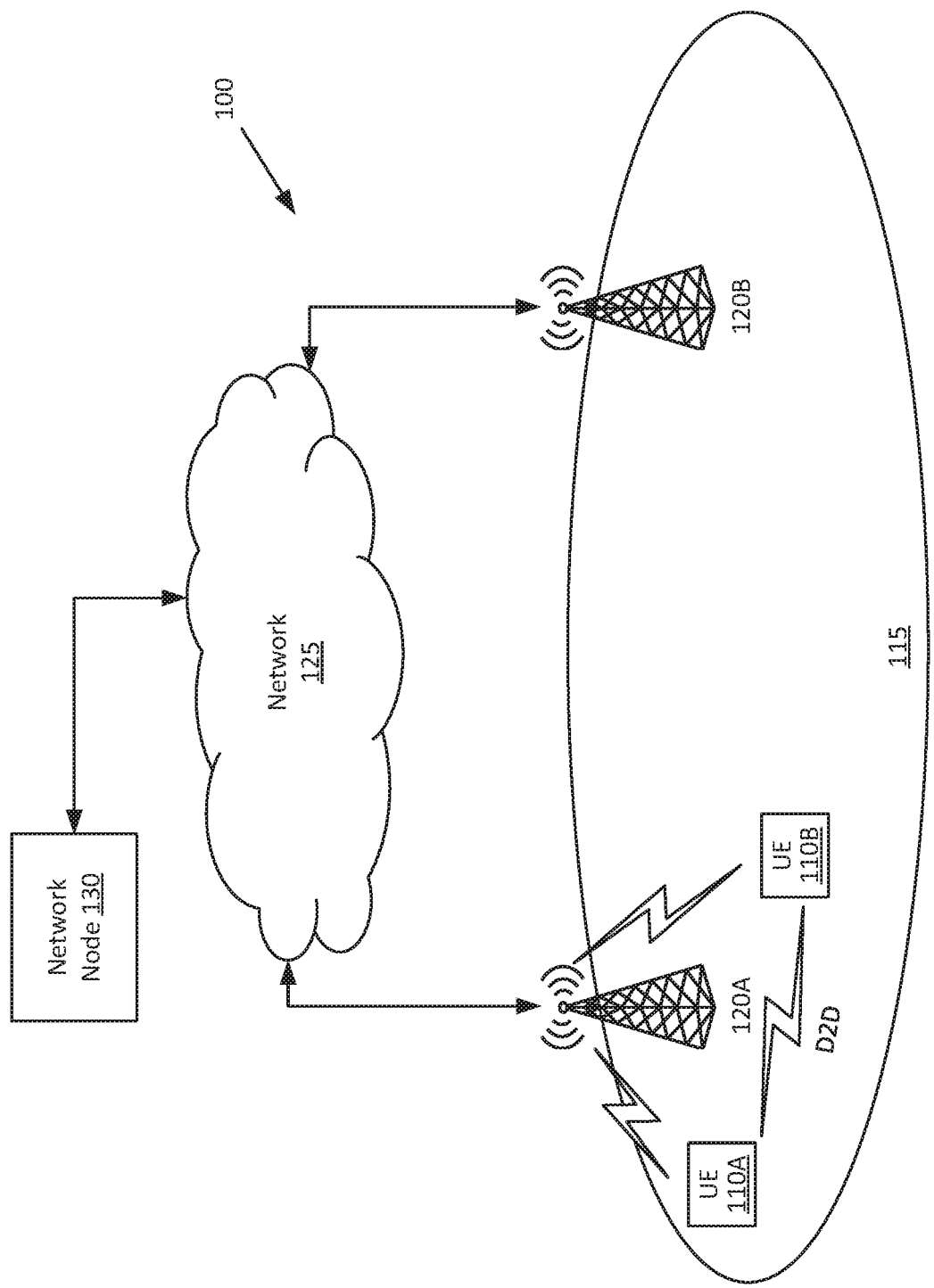
FIG. 3 illustrates an example wireless network.

FIG. 3 illustrates an example of a wireless network 100 that can be used for wireless communications. Wireless network 100 includes wireless devices, such as UEs 110A-110B, and network nodes, such as radio access nodes 120A-120B (e.g. eNBs, gNBs, etc.), connected to one or more core network nodes 130 via an interconnecting network 125. The network 100 can use any suitable deployment scenarios. UEs 110 within coverage area 115 can each be capable of communicating directly with radio access nodes 120 over a wireless interface. In some embodiments, UEs 110 can also be capable of communicating with each other via D2D communication.

As an example, UE 110A can communicate with radio access node 120A over a wireless interface. That is, UE 110A can transmit wireless signals to and/or receive wireless signals from radio access node 120A. The wireless signals can contain voice traffic, data traffic, control signals, and/or any other suitable information. In some embodiments, an area of wireless signal coverage 115 associated with a radio access node 120 can be referred to as a cell.

The interconnecting network 125 can refer to any interconnecting system capable of transmitting audio, video, signals, data, messages, etc., or any combination of the preceding. The interconnecting network 125 can include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, the network node 130 can be a core network node 130, managing the establishment of communication sessions and other various other functionalities for UEs 110. Examples of core network node 130 can include mobile switching center (MSC), MME, serving gateway (SGW), packet data network gateway (PGW), operation and maintenance (O&M), operations support system (OSS), SON, positioning node (e.g., Enhanced Serving Mobile Location Center, E-SMLC), MDT node, etc. UEs 110 can exchange certain signals with the core network node using the non-access stratum layer. In non-access stratum signaling, signals between UEs 110 and the core network node 130 can be transparently passed through the radio access network. In some embodiments, radio access nodes 120 can interface with one or more network nodes over an internode interface.

As discussed, a UE can support operations using different types of control and/or data channels. The channels may differ in terms of the type of reference signals required by the UE for receiving these channels. For example, there are channels which can require only CRS for demodulation of certain channels (e.g. PDCCH, PDSCH, etc.). They are interchangeably referred to as CRS-based channels or CRS-based demodulation, etc. On the other hand, there are certain channels that require the UE to primarily apply UE specific reference signal (e.g. DMRS) for demodulation of these channels (e.g. DMRS-based PDCCH, PDSCH, SPDCCH, MPDCCH, etc.). They are also interchangeably referred to as DMRS-based channels or DMRS-based demodulation, etc.

In the conventional network, when the CRS muting is used in a cell, that cell applies the same CRS muting configuration regardless of the type of channel(s) received by the UE. Overall this approach can lead to an increase in overhead in terms of CRS transmission. This in turn can increase BS power consumption, cell load and interference to UEs especially in neighboring cells.

In some embodiments, the term "RS muting" used herein can comprise a scheme used in a cell where a RS is transmitted over full bandwidth of the cell or at least within the UE RF bandwidth or UE configured reception BW during active time periods (Ta) and during warm-up/cool-down periods before/after the active time periods respectively, and over at least 6 central resource blocks of the cell during the inactive time periods (Tb). The RS may be muted in a cell only in the time/frequency resources where the RS is not required by any UE in the cell, and vice versa—the RS shall be provided at least in the time/frequency resources where the RS is required by at least one UE in the cell. The RS muting is also called as CRS muting, network-based CRS interference mitigation etc.

Some embodiments can be applicable for a UE in a low activity state and/or in high activity state. Examples of low activity states are RRC idle state, idle mode, inactive state, etc. Examples of high activity states are RRC CONNECTED state, active mode, active state, etc. The UE may be configured to operate in DRX or in non-DRX. If configured to operate in DRX, it may still operate according to non-DRX as long as it receives new transmissions from the network node.

According to a first embodiment, a UE determines a reference signal (RS) muting configuration to be used by a network node for transmitting a first type of reference signal (RS1) in a first cell (cell1) based on a type of RS being used (or expected to be used) by the UE for receiving one or more channels in the first cell. The UE uses the determined RS muting configuration for performing one or more operations.

According to a second embodiment, a network node determines a RS muting configuration to be used by the network node for transmitting RS1 in cell1 based on a type of RS being used (or expected to be used) by the UE for receiving one or more channels in cell1 and transmits RS1 in cell1 according to the determined RS muting configuration.

For example, if the UE is using, or is expected to use, a first type of reference signal (RS1) for receiving certain channel (e.g. Slot/Subslot-PDSCH) or signal or performing a measurement (e.g. CQI) then cell1 transmits RS using a first RS muting configuration (MC1) for enabling the UE to perform certain preparatory operations or procedures (e.g. AGC setting, time and/or frequency tracking, etc.) before or during the reception of the channel or signal using RS1. But if the UE is using, or is expected to use, a second type of reference signal (RS2) for channel or signal reception or performing a measurement (e.g. CQI), then cell1 transmits RS using a second RS muting configuration (MC2) for enabling the UE to perform certain preparatory operations or procedures (e.g. AGC setting, time and/or frequency tracking, etc.) before or during the reception of the channel using RS1.

In some further examples, the UE may need both RS1 and RS2, in which case the muting configurations for both signal types may need to be adapted to ensure the RS1 and RS2 signal availability when the UE needs them for performing one or more of its operations. Examples of RS1 and RS2 are CRS and DMRS respectively. For receiving one or more channels, the UE may execute operations such as channel estimation, demodulation, decoding, etc. for determining the contents of the channels. In one example, a first RS muting configuration (MC1) comprises transmitting K1 number of time resources with RS1 over the full cell BW in cell1 before the UE starts receiving the channel in cell1. In another example, a second RS muting configuration (MC2) comprises transmitting K2 number of time resources with RS1 over the full cell BW before the reception of the channel, where K1 and K2 are different. As an example, K1>K2, e.g. K1=8 subframes and K2=4 subframes. As an example, MC1 can be employed when RS1 (e.g. CRS) is used by the UE for preparatory operations and is also used by the UE for the channel reception. In another example, MC2 is employed when RS1 (e.g. CRS) is used by the UE for preparatory operations while RS2 (e.g. DMRS or CSI-RS) is used for the channel reception.

According to a first aspect of a first embodiment, a UE served by a first cell (cell1), which in turn is managed or served by a network node, determines a RS muting configuration used in cell1 based on the type of the reference signal which the UE is using or is expected to use for receiving one or more channels (e.g. PDCCH, PDSCH, SPDCCH, etc.) or, more generally, one or more signals. The reception of channel(s) herein may also comprise performing one or more measurements such as channel state information (CSI) measurements e.g. CQI, PMI, RI, etc. The UE is configured to receive one or more channels based on a pre-defined configuration information and/or based on a message received from a network node e.g. a RRC message. The terminology "reception of a channel" (or "receiving a channel") can comprise one or more procedures associated with the channel or signal reception, e.g. channel estimation for the channel, demodulation of the channel, decoding of the channel, measurement, etc. The UE can use at least one type of reference signal to successfully receive the one or more channel(s). Examples of such reference signals are DMRS, CSI-RS, CRS, etc.

According to a second aspect of the first embodiment, the UE further uses the determined RS muting configuration for performing one or more preparatory operations, which assist the UE to receive the channel. These preparatory operations are interchangeably referred to as preparatory procedures, supplementary procedures or operations, warm up or cool down procedures or operations for receiving one or more channels, etc. It is assumed that a first type of RS (RS1) is muted in cell. The muting of RS1 can also be called "lean carrier operation" in cell1. More specifically, in lean carrier operational mode, cell1 transmits a first reference signal (RS1) over at least a first bandwidth (BW1) and transmits RS1 over at least a second bandwidth (BW2) when there is UE activity or when the UE activity is expected, and where BW2>BW1. In one example, BW1 comprises 6 central RBs within cell1 bandwidth and BW2 comprises cell1 bandwidth. In another example BW1=central 6 RBs while BW2=50 RBs when cell1 BW=50 RBs. In yet another example BW1=central 6 RBs while BW2=central 50 RBs for the case when cell1 BW=100 RBs.

More specifically, the UE can use RS1 transmitted in cell1 according to the determined RS muting configuration for one or more preparatory or warm up or cool down operations. These supplementary or preparatory operations with respect to cell1 may be performed by the UE prior to receiving the channel and/or during the channel reception and/or even after the channel reception. The purpose of these preparatory operations is to prepare the UE receiver to receive (e.g. demodulate, decode, etc.) the channel. These preparatory operations are primarily related to the synchronization of the UE receiver with respect to the radio conditions in cell1 from where the UE is also receiving or is going to receive one or more channels. The radio conditions can be characterized by means of one or more of: UE speed, delay spread of the radio channel, number of multi-paths and their relative strength with respect to each other, signal level (e.g. received power), etc. Specific examples of such preparatory operations are automatic gain control (AGC) setting, automatic frequency correction (AFC) acquisition, time tracking and/or frequency tracking etc. The AGC setting enables the UE to adjust the gain of the receiver input level. The AFC allows the UE to adjust and synchronize with respect to the frequency especially due to change in UE the Doppler frequency (e.g. due to UE mobility). These preparatory procedures which are mainly related to the synchronization with respect to cell1 are also called herein as a first set of procedures (SP1). The UE further uses either the same RS (as used for muting) or a different type of reference signal for actual reception of one or more channels. These procedures, which are mainly related to the reception of one or more channels in cell1, are also called herein a second set of procedures (SP2). Example of SP2 is channel estimation used for the demodulation of received signal. Whether the UE uses the same or different types of RS for performing procedures SP1 and SP2 depend on the type of channel. The set of procedures, SP1, enable the UE to prepare to receive the channel, while the set of procedures, SP2, enables the UE to determine the contents or information in the channel e.g. higher layer information encoded in the channel.

In one example, a first type of RS (RS1) used for muting in cell1 is used by the UE for performing SP1, while also the same RS1 is used by the UE for receiving the channel (e.g. demodulation of SPDCCH). In this first example, RS1 is configured with a first type of RS muting configuration (MC1) in cell1. In another example, RS1 used for muting in cell1 is used by the UE for performing SP1, while a second type of RS (RS2) is used by the UE for receiving the channel (e.g. demodulation of SPDCCH). In this second example, RS1 is configured with a second type of RS muting configuration (MC2) in cell1. Specific examples of RS1 and RS2 are CRS and DMRS respectively. Yet another set of specific examples of RS1 and RS2 are CRS and CSI-RS respectively.

In a first set of examples, the UE is configured to receive one or more signals based only on CRS as a reference signal. In one of the first set of examples the UE is configured to receive the channel (e.g. SPDCCH) by using only CRS e.g. referred to as "CRS-based SPDCCH reception". In another first set of examples, the UE is configured to receive a signal for performing certain type of measurements (e.g. CQI) by using CRS, e.g. "CRS-based CSI reporting".

In a second set of examples the UE is configured to receive a signal using a RS which is different than CRS, e.g. DMRS, CSI-RS, MBSFN RS, etc. In one of a second set of examples the UE is configured to receive channel (e.g. SPDCCH) by using DMRS, e.g. "DMRS-based SPDCCH reception". In another second set of examples, the UE is configured to receive signal for certain measurement (e.g. CQI) by using CSI-RS, e.g. "CSI-RS-based CSI reporting". The main idea is that when the UE uses RS1 for both types of procedures, SP1 and SP2, then the RS muting configuration used in cell1 contains larger number of time resources with unmuted RS1 compared to the case when the UE uses RS1 only for SP1 or only for SP2.

Different RS muting configurations can be distinguished by using different sets of one or more parameters defining the muting pattern. Examples of such parameters are the number of warm up (WU) time resources, number of cool down (CD) time resources, bandwidth of RS1 in time period when RS1 is muted, bandwidth of RS1 in time period when RS1 is not muted, bandwidth of RS1 in WU time period, bandwidth of RS1 in CD time period, etc. In WU and CD time periods, the RS1 is not muted or is partially muted (e.g. transmitted over BW larger than in time period where RS1 is muted). Typically, in WU and CD time resources, RS1 is transmitted over BW=BW2. The RS1 in WU time resources are used by the UE for performing set of procedures, SP1. The RS1 in CD time resources may also be used by the UE for performing certain set of procedures, SP1, e.g. time synchronization with respect to cell1 for post channel estimation to decode the channel received before the start of the CD time period. The adaptation of the RS muting configuration (e.g. between MC1 and MC2) in cell1 based on the type of RS used by the UE for the channel reception is elaborated with several examples as follows.

Figure 4A:
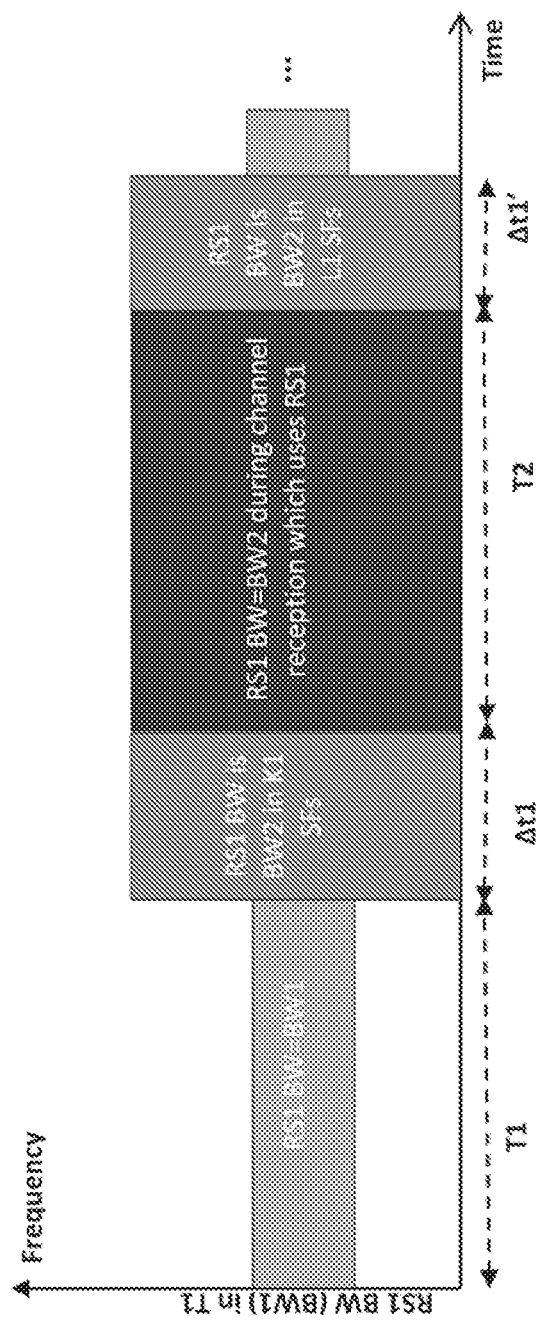
FIG. 4 illustrates a examples of RS muting configurations.

FIG. 4 illustrates examples of RS muting configurations. FIG. 4a is a first example embodiment of a RS muting configuration. This example includes first and second BW configurations (BW1 and BW2) when RS1 is muted and when RS1 is not muted, respectively, with a number of WU SFs=K1 and CD SFs=L1.

In the example of FIG. 4a, the RS muting configuration MC1, which can be used for muting RS1 in cell, comprises K1 number of warm-up (WU) time resources and L1 number of cool-down (CD) time resources. Time resources can include a subframe (SF), time slot, subslot, etc. In this example the UE is also configured to receive the channel based on RS1, i.e. which requires the UE to apply RS1 for the second set of procedures, SP2, for the channel reception. During time period, T1, the RS1 is muted and is therefore transmitted over BW=BW1 (e.g. 6 RBs) within the center of the cell1's BW. During T2, the UE receives or is expected to receive at least one channel (e.g. SPDCCH). Therefore, during T2, RS1 is unmuted or partially muted and is transmitted over BW=BW2 (e.g. over entire cell1's BW or over at least the BW of the channel). In addition, during warm up (WU) time period, Δt1, RS1 is also transmitted over BW2. Also, during the CD time period, Δt1', RS1 is also transmitted over BW2. As special case, Δt1'=0. During the WU time period, Δt1', the UE uses RS1 for set of procedures, SP1 e.g. AGC setting, time and/or frequency tracking of signals in cell1. This will ensure that the UE can successfully receive the channel during T2. In the example of FIG. 4a, the UE also uses RS1 during T2 for the actual reception of the channel. For example, the channel can be the one requiring CRS based demodulation procedure. This means for both SP1 and SP2 type procedures the UE uses the same type of RS e.g. CRS signals. As an example, in MC1 the number of WU time resources (K1) and CD time resources (L1) can be 8 subframes and 2 subframes respectively. In another example in MC1, K1 and L1 can be 8 subframes and 1 subframe respectively.

Figure 4B:
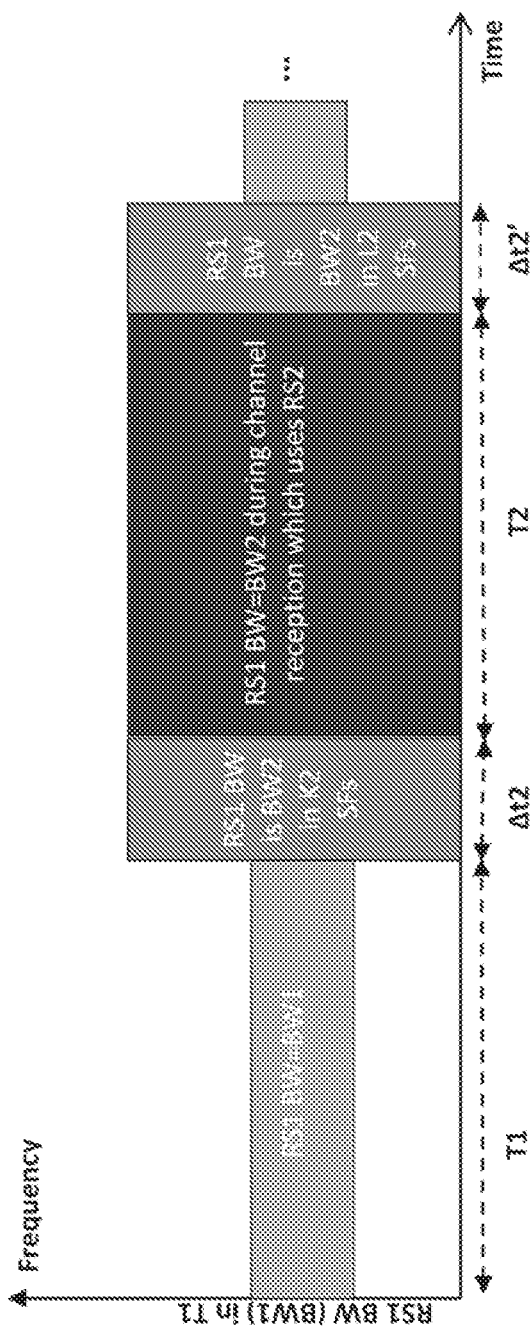

FIG. 4b illustrates a second example embodiment of a RS muting configuration. This example includes a first and second BW configurations (BW1 and BW2) when RS1 is muted and when RS1 is not muted, respectively, with a number of WU SFs=K2 and CD SFs=L2.

In the example of FIG. 4b, the RS muting configuration, MC2, which can be used for muting RS1 in cell, comprises K2 number of WU time resources and L2 number of CD time resources. In this example the UE is configured to receive the channel based on another type of RS such as a second type of RS (RS2), i.e. which requires the UE to apply RS2 for the second set of procedures (SP2) for the channel reception. Examples of RS1 and RS2 are CRS and DMRS respectively. Another set of examples of RS1 and RS2 are CRS and CSI-RS respectively. During T1, the RS1 is muted and is therefore transmitted over BW=BW1 (e.g. 6 RBs) within the center of the cell1's BW. During T2, the UE receives or is expected to receive at least one channel (e.g. SPDCCH) using at least RS2. During T2 the UE may also use RS1 for a first set of operations e.g. for time/frequency tracking, further refinement of the timing or fine tuning etc. Therefore, during T2, RS1 is unmuted or partially muted and is transmitted over BW=BW2 (e.g. over entire cell1's BW or over at least the BW of the channel). In addition, during both WU time period, Δt2, and CD time period, Δt2', RS1 is also transmitted over BW2. However, in this second example at least one of the WU and CD periods are different compared to their respective values in the first example in FIG. 4a (e.g. where MC2 is used in cell). As special case, Δt2'=0. During the WU time period, Δt2', the UE also uses RS1 for set of procedures, SP1 e.g. AGC setting, time and/or frequency tracking of signals in cell1. But the UE does not use RS1 for the reception of channel in T2 but it may use for fine tuning of the UE timing. Therefore, overall the UE is less dependent on RS1 for channel reception in this case where RS1 is used mainly for SP1 (FIG. 4b) compared to the case where the UE needs RS1 for both SP1 and SP2 (i.e. in the example of FIG. 4a). As an example, in MC2, the number of WU time resources (K2) and CD time resources (L2) can be 4 subframes and 2 subframes respectively. In another example in MC2, K2 and L2 can be 4 subframes and 1 subframe respectively. In general, MC1 and MC2 in examples 1 and 2 differ by virtue of least one of the following conditions: K2<K1 or L2<L1.

Figure 4C:
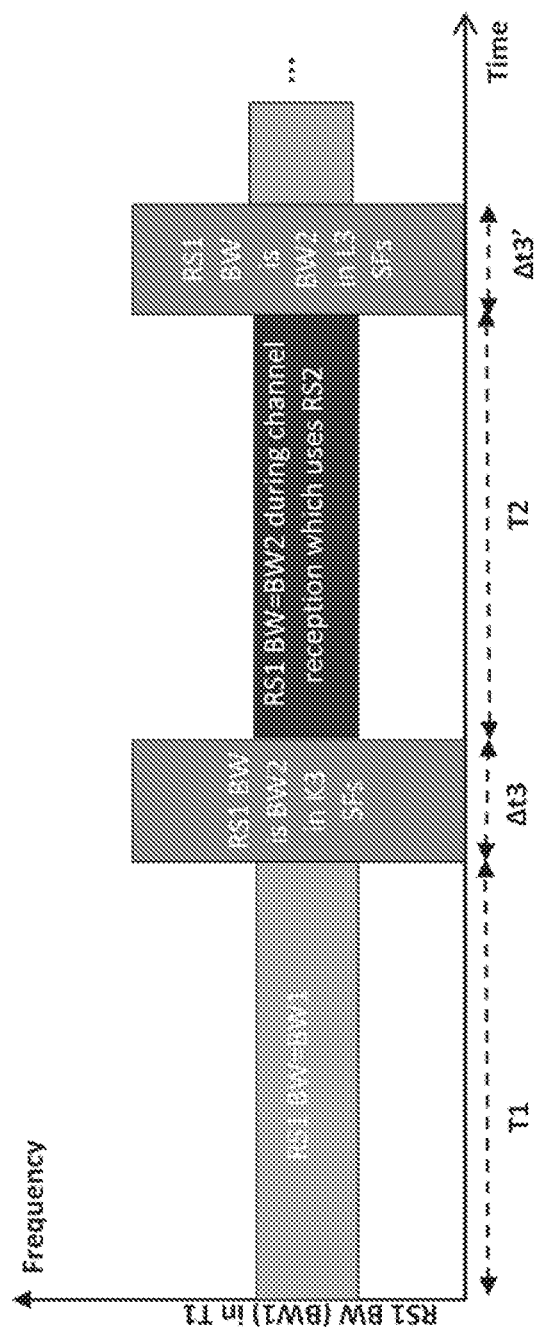

FIG. 4c illustrates a third example embodiment of a RS muting configuration. This example includes first and second BW configurations (BW1 and BW2) when RS1 is muted and when RS1 is not muted, respectively, with a number of WU SFs=K3 and CD SFs=L3.

In the example of FIG. 4c, the UE also uses RS2 for receiving a channel in T2. The UE also needs RS1 during WU and/or CD time periods like in example in FIG. 4. However, the UE does not use RS1 during T2 i.e. during the actual reception of the channel. This may again depend on the type of channel. For example, the UE may need only RS2 for entire demodulation of RS2 and may use RS2 for any synchronization related procedures during T2 if required i.e. while receiving the channel Therefore, in this case the network node may transmit RS1 in cell1 according to a third RS muting configuration (MC3), which can be used for muting RS1 in cell. In this case cell1 may use K3 number of WU time resources (Δt3) and L3 number of CD time resources (Δt3'). In this example as well as special case, Δt3'=0. In this way by using MC3, the BW of RS1 can be reduced to BW1 also during T2. This in turn leads to reduction in power consumption in cell1 and also reduces interference in the network. As an example, in MC3 the number of WU time resources (K3) and CD time resources (L3) can be 8 subframes and 2 subframes respectively. In another example in MC3, K3 and L3 can be 4 subframes and 2 subframes respectively.

Figure 5:
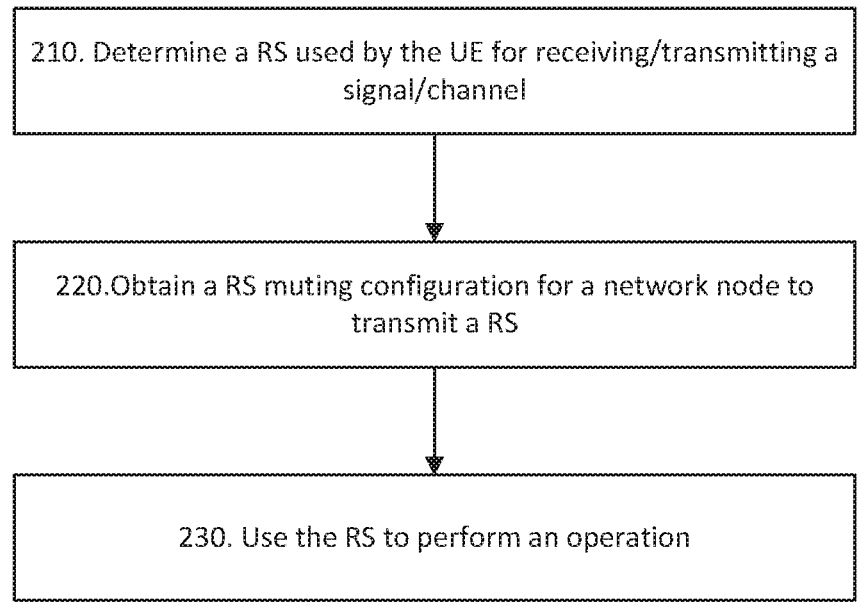
FIG. 5 is a flow chart illustrating a method which can be performed in a wireless device.

FIG. 5 is a flow chart illustrating a method which can be performed in a wireless device, such as UE 110. The UE can be served/managed by a network node transmitting at least one RS in a cell according to lean carrier operation. The method can include:

Step 210: Determining if a RS is being used, or is expected to be used, by the UE for operating one or more signals/channels in a cell. Operating the channel can include transmitting/receiving signals to/from the network node. This can include determining the type of RS being used to operate the channel.

In some embodiments, the determined type of RS includes only a first RS type (RS1). In some embodiments, the determined type of RS includes the first RS type (RS1) and a second RS type (RS2). In some embodiments, the determined type of RS does not include the first RS type (RS1).

Step 220: Obtaining a RS muting configuration to be used by a network node for transmitting a first RS in the cell. In some embodiments, the RS muting configuration is determined in accordance with the type of RS being used (or expected to be used) by the UE for reception of the signal(s)/channel(s). In some embodiments, the RS muting configuration is determined further in accordance with a relation or association between the types of RS for signal/channel receptions and the RS muting configuration(s). In some embodiments, the RS muting configuration can comprise one or more parameters including a first number of WU subframes (K1) and/or first number of CD subframes (L1) provided the type of RS for signal reception is a first RS type (RS1), and a second number of WU subframes (K2) and/or second number of CD subframes (L2) provided the type of RS for signal reception is different than RS1.

Step 230: Receiving the RS in accordance with the RS muting configuration and using the received RS for performing one or more operations.

It will be appreciated that one or more of the above steps can be performed simultaneously and/or in a different order. Also, steps illustrated in dashed lines are optional and can be omitted in some embodiments.

Figure 6:
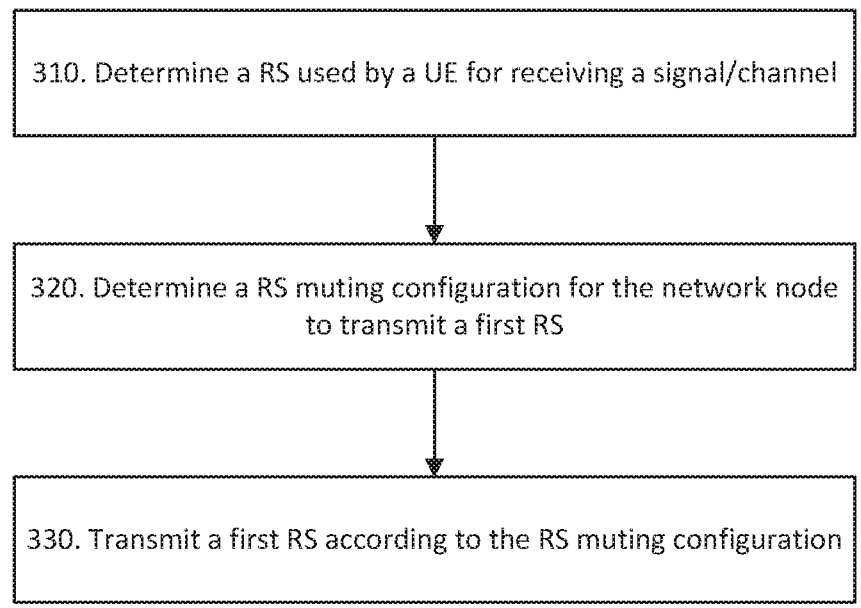
FIG. 6 is a flow chart illustrating a method which can be performed in a network node.

FIG. 6 is a flow chart illustrating a method which can be performed in a network node. In some embodiments, the network node can be a radio access node 120. The radio access node 120 can be an eNB or gNB as have been described herein. The network node can serve/manage a cell and transmit at least one RS according to lean carrier operation. The method can include:

Step 310: Determining if a first RS is being used, or is expected to be used, by a UE for transmitting/receiving one or more signals/channels in a cell. The signals/channels can be transmitted to and/or received from the network node. This determination can include determining a RS type of the first RS.

In some embodiments, the determined type of RS includes only a first RS type (RS1). In some embodiments, the determined type of RS includes the first RS type (RS1) and a second RS type (RS2). In some embodiments, the determined type of RS does not include the first RS type (RS1).

Step 320: Determining a RS muting configuration to be used by a network node for transmitting the first RS in the cell. In some embodiments, the RS muting configuration is determined in accordance with the type of RS being used (or expected to be used) by the UE for reception of the signal (s)/channel(s). In some embodiments, the RS muting configuration is determined further in accordance with a relation or association between the types of RS for signal/channel receptions and the RS muting configuration(s). In some embodiments, the RS muting configuration can comprise one or more parameters including a first number of WU subframes (K1) and/or first number of CD subframes (L1) provided the type of RS for signal reception is a first RS type (RS1), and a second number of WU subframes (K2) and/or second number of CD subframes (L2) provided the type of RS for signal reception is different than RS1. In some embodiments, the number of WU and/or CD time resources can be adapted in accordance with determining whether the RS is used for operating the channel or used for other (e.g. preparatory) operations.

Step 330: Transmitting a first RS in the cell according to the determined RS muting configuring for enabling the UE to perform one or more operations. The first RS can be broadcast in the cell and/or transmitted to the UE.

It will be appreciated that one or more of the above steps can be performed simultaneously and/or in a different order. Also, steps illustrated in dashed lines are optional and can be omitted in some embodiments.

In some networks, packet data latency is a performance metric that is measured by vendors and operators and also by end-users (e.g. via speed test applications). Short Transmission Time Interval (TTI) is a feature enabling a drastic shortening of the LTE round trip time. The Short TTI feature consists of three main components:

1) The introduction of transmissions shorter than one subframe in PDSCH and PUSCH.
2) The introduction of new short in-band DL control (SPDCCH) and new short UL control (SPUCCH).
3) The reduction of processing time and related procedures (e.g. HARQ).

Short physical downlink control channel (SPDCCH) is used to schedule the slot-based/subslot-based PDSCH. Two TTI configurations for PDSCH have been standardized:

1) TTI configuration for 7 OFDM symbols (or slot-based PDSCH); and
2) TTI configuration for 2/3 OFDM symbols (or subslot-based PDSCH).

Figure 7:
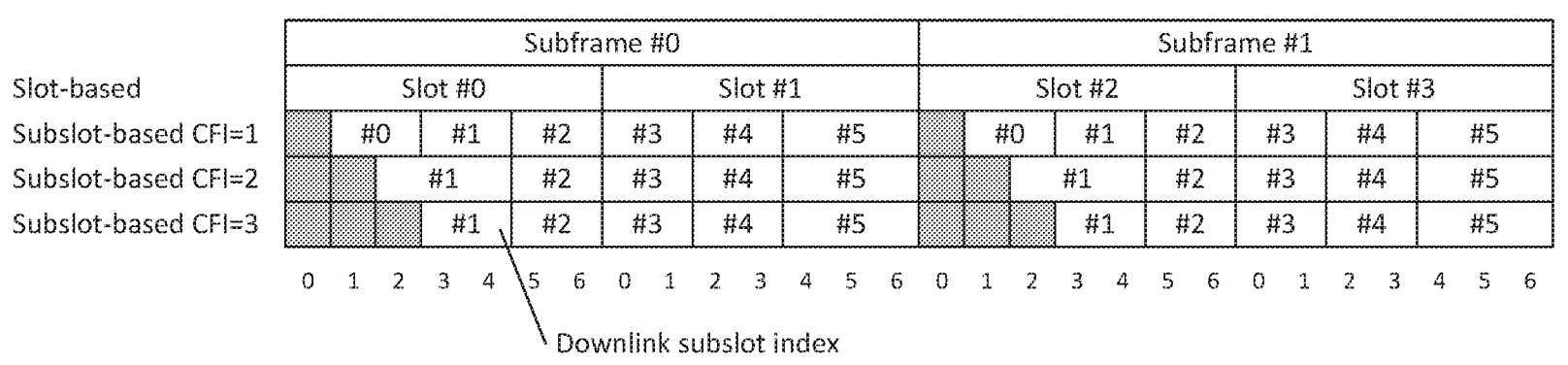

The slot-based PDSCH supports both FDD and TDD, but subslot-based PDSCH supports FDD only. Number of OFDM symbols in the subslot depends on the CFI (Number of OFDM symbols allocated for control channel region). FIG. 7 illustrates an example slot index used for slot-based PDSCH and subslot index used for subslot-based PDSCH.

SPDCCH uses CRS or DMRS for demodulation reference symbols, configured by the RRC parameter spdcch-SetReferenceSig={crs, dmrs}. Depending on whether it is the CRS-based or DMRS-based, the number of configurable OFDM symbols used for SPDCCH are different as shown in Table 1. When the DMRS-based SPDCCH is used, UE may assume the same precoding is applied on the two PRBs in frequency domain. The number of OFDM symbols for CRS-based SPDCCH is signaled by the RRC parameter spdcch-NoOfSymbols={1,2}.

| Number of supports OFDM symbols for SPDDCH | | |
|---|---|---|
| Reference signal | sTTI configuration | Number of OFDM symbols |
| CRS-based SPDCCH | Subslot-based | 1 or 2 symbols |
| | Slot-based | 1 or 2 symbols |
| DMRS-based SPDCCH | Subslot-based | 2 symbols for sTTI index #1 with CFI = 1/3 |
| | | 3 symbols for sTTI index #1 with CFI = 2 |
| | | 2 symbols for sTTI index #2, #3, #4 |
| | | 3 symbols for sTTI index #5 (Note 1) |
| | Slot-based | 2 symbols |

Note 1:
DCI in sTTI index #0 is transmitted with PDCCH.

PDSCH configured by SPDCCH also supports CRS-based and DMRS-based transmissions. CRS-based SPDCCH can schedule both CRS-based and DMRS-based PDSCH; DMRS-based SPDCCH can schedule DMRS-based PDSCH only. For FDD, both the slot-based and subslot-based PDSCH support TM1, TM2, TM3, TM4, TM6, TM9 and TM10. For TDD, the slot-based PDSCH supports TM1, TM2, TM3, TM4, TM6, TM8, TM9 and TM10. The number of MIMO layers are up to 4 for CRS-based transmission and are also up to 4 for TM9/TM10. For TM8, the number of MIMO layers are up to 2.

SPUCCH: As with other channels, the physical uplink control channel is also shortened with sTTI operation, defined by the standard for slot-based and subslot-based transmissions, in addition to several new SPUCCH formats with different characteristics in terms of supported HARQ payload sizes and user multiplexing capabilities.

Subslot-PUSCH, Slot-PUSCH: For subslot/slot based PUSCH, both TM1 (single transmit antenna) and TM2 are supported. TM2 (i.e., precoding-based uplink MIMO transmission) can be used to either improve the reliability by using beamforming, or to improve the spectral efficiency by using spatial multiplexing.

To support sTTI operation, not only DL and UL control and data channels are transmitted based on a slot/subslot TTI configuration but also DL DM-RS and UL DM-RS.

In conventional networks with sTTI, the position(s) of the transmitted/received channels (DL channels such as SPDCCH and sTTI PDSCH and UL channels such as SPUCCH and sTTI PUSCH) and signals (DL DM-RS and UL DM-RS) can vary greatly within a subframe. But sTTI positions within the subframe are currently not considered in the network-based CRS interference mitigation.

Another potential issue is that some channels, including SPDCCH and sTTI PDSCH, can rely on CRS or DM-RS for demodulation which is also not taken into account in the network-based CRS interference mitigation.

The lack of consideration of these aspects of the sTTI operation can lead to unnecessary transmission of CRS over the full bandwidth. This, in turn, can lead to increase in signal overheads, increase in transmission power and increase in interference caused by the CRS in the network. Therefore, the full benefit of network-based CRS interference mitigation is not achieved when the sTTI feature is used in the network.

In some embodiments, systems and methods for determining a RS muting configuration based on the associated signal/channel position within a time resource (e.g. subframe, slot, etc.) in a first cell (cell1) will be described herein. The UE is served by cell1, which can operate in a lean carrier operational mode, where RS1 (e.g. CRS) is transmitted over a reduced bandwidth (e.g. BW1) during an inactive time of the UE and over larger bandwidth (e.g. BW2) during an active time of the UE, where BW1<BW2. In an example case, BW1=6 central RBs within cell BW and BW2=BW of the cell or at least the UE RF bandwidth or UE configured reception BW. The UE can be further configured by a network node and/or based on a pre-defined rule to perform one or more of the following operations in cell1: receive one or more channels, transmit one or more channels, and/or perform one or more CSI measurements (e.g. CQI, PMI, RI, etc.).

An example of a first RS (RS1) is CRS. Examples of associated signal/channel are DL or UL signals/channels which require warm-up and/or cool-down subframes comprising RS1 include:

UL reference signal, UL DM-RS, SRS, UL control channel, UL data channel

DL reference signal, DL DM-RS, CSI-RS (e.g., for CSI measurements), DL control channel, DL data channel.

The associated signal/channel position within a time resource (e.g. subframe) may be configurable (e.g., with slot-based or subslot-based with sTTI) or pre-defined (e.g., for SRS).

In some embodiments, the examples described herein are applicable for FDD.

Figure 8:
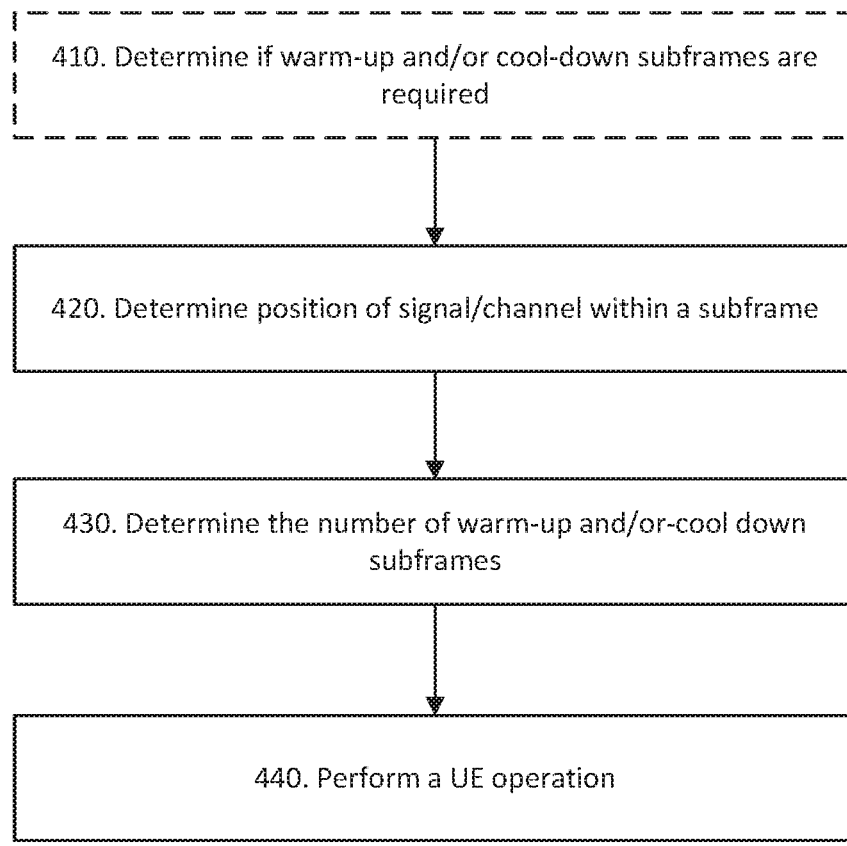
FIG. 8 is a flow chart illustrating a method which can be performed in a wireless device.

FIG. 8 is a flow chart illustrating a method which can be performed in a wireless device, such as UE 110. The UE can be served/managed by a network node transmitting at least one RS in a cell according to lean carrier operation. The method can include:

Step 410: (optional) Determining whether a signal/channel to be received or transmitted by the UE requires at least one of warm-up and/or cool-down subframes for a muting pattern associated with a first RS (RS1). The UE can be operating in a first cell (cell1), which operates in lean carrier operational mode.

Step 420: Determining the position of the signal/channel within a subframe.

Step 430: Based at least in part on the results of the first and/or second determining steps, determining the number N1 of warm-up and/or the number N2 of cool-down subframes. The muting pattern for RS1 can be configured to include the N1 warm-up and/or N2 cool-down subframes.

Step 440: Receiving RS1 in accordance with the configured muting pattern and performing a UE operation based on the corresponding RS1. The UE operation can comprise one or more of: signaling of the determined RS1 muting pattern to the network node; performing reception or transmission of the corresponding signal/channel; and performing one or more measurements such as channel state information (CSI) measurements e.g. CQI, PMI, RI, etc.

It will be appreciated that one or more of the above steps can be performed simultaneously and/or in a different order. Also, steps illustrated in dashed lines are optional and can be omitted in some embodiments.

Figure 9:
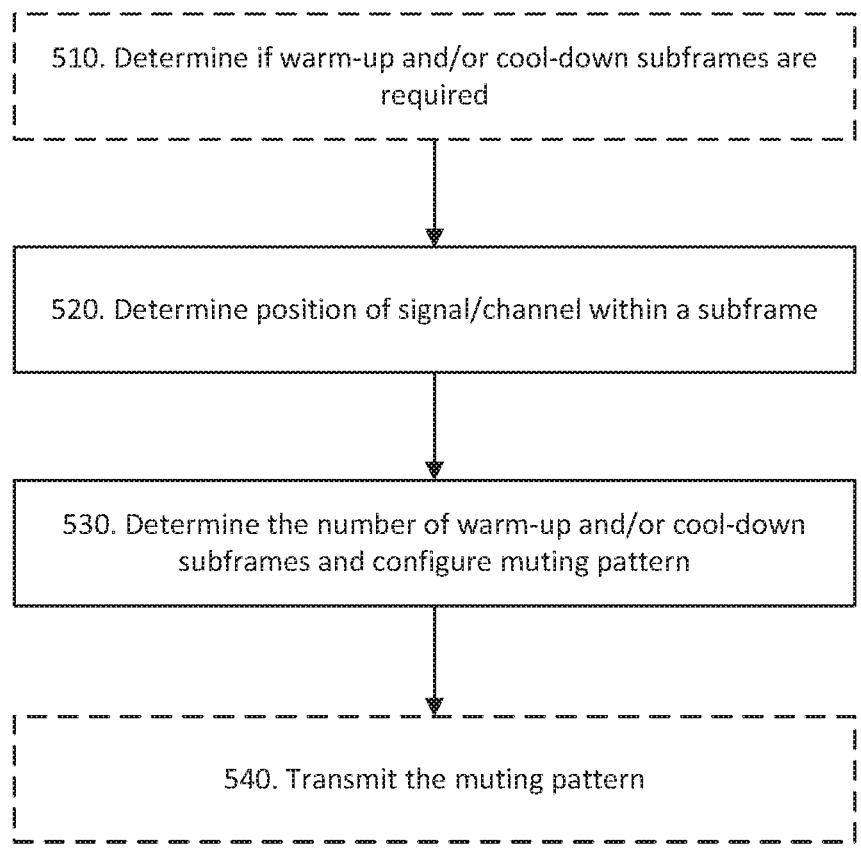
FIG. 9 is a flow chart illustrating a method which can be performed in a network node.

FIG. 9 is a flow chart illustrating a method which can be performed in a network node. In some embodiments, the network node can be a radio access node 120. The radio access node 120 can be an eNB or gNB as have been described herein. The network node can serve/manage a cell and transmit at least one RS according to lean carrier operation. The method can include:

Step 510: (optional) Determining whether a signal/channel to be received from or transmitted by a UE requires warm-up and/or cool-down subframes for a muting pattern associated with a first RS (RS1) in a first cell (cell1).

Step 520: Determining the position of the signal/channel within a subframe.

Step 530: Based at least in part on the results of the first and/or second determining steps, determining the number N1 of warm-up and/or the number N2 of cool-down subframes and configuring the RS1 muting pattern accordingly.

Step 540: (optional) Transmitting RS1 in accordance with the configured RS1 muting pattern. The RS1 muting pattern can be signaled to the UE or to another network node.

It will be appreciated that one or more of the above steps can be performed simultaneously and/or in a different order. Also, steps illustrated in dashed lines are optional and can be omitted in some embodiments.

In one example, with CRS as RS1, for a UE performing one or more of: monitoring SPDCCH, receiving PDSCH, performing CSI measurement, transmitting SPUCCH, or transmitting PUSCH, in a later part of a time resource (e.g. in a subframe, for example in the last slot or in the last subslot of a time resource such as in a subframe), the time resource (e.g. the subframe) is included in the active time period T1 and preceded by N1=K1 time resources (e.g. K1=7 subframes). Otherwise, for example, when the UE performs the reception/transmission of channel or CSI measurement in an earlier part of a time resource (e.g. subframe), then N1=K1' where K1 and K1' are different. More specifically K1'>K1 e.g. K1'=8 time resources, e.g. N1=K'=8 subframes when the UE performs the reception/transmission in an earlier part of a time resource.

In a further example, if the UE is configured to perform the reception/transmission of channel or CSI measurement in a last subslot within a subframe then the UE shall assume that N1=K1, while if the UE is configured to perform the reception/transmission of channel or CSI measurement in any subslot other than in the last subslot within a subframe then N1=K1' where K1'>K1 as stated earlier. Assume there are J number of subslots within a subframe ranging from subslot number #1, J, where J is the last subslot within a time resource, e.g. J=6 subslots in a subframe. This example which defines an association between the location of the subslot in a subframe and the RS muting pattern in cell1 is illustrated in Table 2. In this example, the UE operation may comprise one or more of: channel reception, channel transmission and/or CSI measurements.

TABLE 2

Number of WU subframes within RS muting pattern in
cell1 based on location of subslot in a subframe

| RS muting pattern ID | Subslot location within a subframe configured for operation(s) in cell1 | Number of WU subframes (N1) in RS muting pattern |
|---|---|---|
| 0 | Subslot number = J | K1 (e.g. K1 = 7) |
| 1 | Subslot number < J | K1'; K1' > K1 (e.g. K1' = 8) |

Figure 10A:
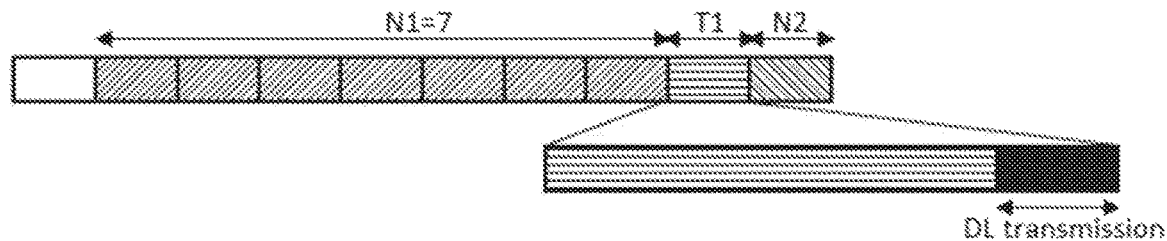
FIG. 10 illustrates example RS muting configurations.
Figure 10B:
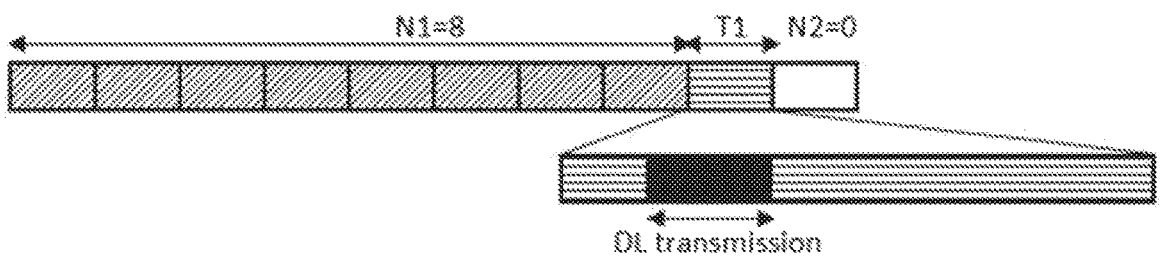
Figure 10C:
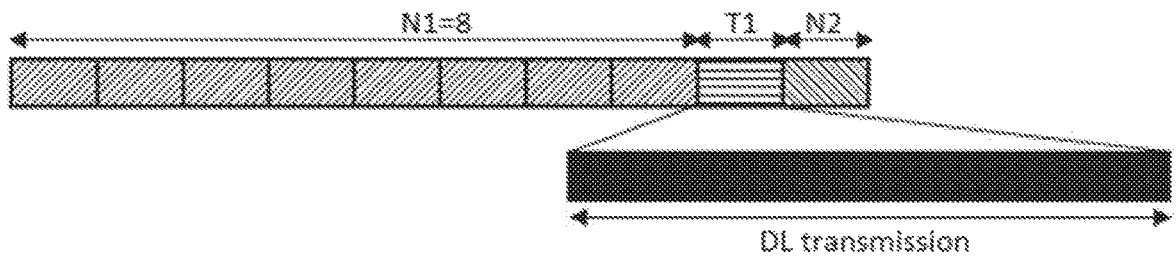

FIG. 10 illustrates further examples of RS muting configurations including warm-up and cool-down subframes. FIG. 10a illustrates warm-up subframes (N1), cool-down subframes (N2), and active time (T1) when a DL transmission is in the last subslot of the subframe. FIG. 10b illustrates warm-up subframes (N1), cool-down subframes (N2), and active time (T1) when a DL transmission is in an earlier part of the subframe. FIG. 10c illustrates warm-up subframes (N1), cool-down subframes (N2), and active time (T1) when UE receives in DL in the whole subframe.

In some embodiments, this can be further generalized beyond sTTI as: for a UE receiving or transmitting a signal/channel (e.g., UL reference signal, UL DM-RS, SRS, UL control channel, UL data channel; DL reference signal, DL DM-RS, CSI-RS, DL control channel, DL data channel, or performing CSI measurement) in a later part of a subframe (e.g., in the last slot or in the last subslot of a subframe), the subframe with the channel/signal to be transmitted or received is comprised in the active time period T1 and preceded by N1=7 subframes (e.g. FIG. 10a). Otherwise, when the UE is performing the reception/transmission in an earlier part of a subframe, N1 is larger, e.g. N1=8 (e.g. FIGS. 10b, 10c).

The UE can further be required to meet one or more requirements (e.g., performance requirements, demodulation requirements, accuracy requirements, etc.), when operating with the determined RS1 muting configuration.

It will be appreciated that the corresponding UE examples described with respect to FIG. 8 are also relevant to the network node embodiments of FIG. 9.

In other embodiments, systems and methods for determining a reference signal (RS1) muting pattern based on the associated signal/channel position within a subframe and the reference signal (RS2) type in the complimentary operation (e.g., demodulation of the associated channel) for the associated signal/channel will be described herein. The UE is served by a first cell (cell1), which operates in a lean carrier operational mode, where the RS1 (e.g. CRS) is transmitted over a reduced bandwidth (e.g. BW1) during an inactive time of the UE and over a larger bandwidth (e.g. BW2) during an active time of the UE, where BW1<BW2. As an example case, BW1=6 central RBs within cell BW and BW2=BW of the cell or at least the UE RF bandwidth or UE configured reception BW. The UE can be further configured by a network node and/or based on a pre-defined rule to perform one or more of the following operations in cell1: receive one or more channels, transmit one or more channels, and/or perform one or more CSI measurements (e.g. CQI, PMI, RI, etc.).

An example of RS1 is CRS. Examples of associated signal/channel are DL signals or channels which require warm-up and/or cool-down subframes comprising RS1 include: DL reference signal, DL DM-RS, CSI-RS (e.g., for CSI measurements), DL control channel, DL data channel.

The associated signal/channel position within a subframe may be configurable (e.g., with slot-based or subslot based with sTTI) or pre-defined.

In one example, the embodiments described herein are applicable for FDD.

Some embodiments include determining whether the second reference signal (RS2) used for a complementary operation to the reception of the signal/channel (e.g., demodulation of the channel) is the same or different from the first reference signal (RS1).

In one example, with CRS as RS1, for UE performing one or more of: monitoring SPDCCH, receiving PDSCH, or performing a CSI measurement, in a later part of a subframe (e.g., in the last slot or in the last subslot of a subframe), the subframe is comprised in the active time period T1 and preceded by N1 subframes where:

N1=3 if RS2 is different from RS1 (e.g., RS2 is CSI-RS or DL DM-RS)

N1=7 if RS2 is CRS.

Otherwise, for example, if the reception of the channel/signal is performed in an earlier part of a subframe, N1 is a larger number (e.g. N1=8).

In a further example (which is also illustrated in Table 3), if the UE is configured to perform the reception/transmission of channel or CSI measurement in a last subslot within a subframe using RS2 (which is different than RS1) (e.g. DMRS, CSI-RS, etc.), then the UE shall assume that N1=L1. If the UE is configured to perform the reception/transmission of channel or CSI measurement in any subslot other than in the last subslot within a subframe using RS2, then N1=L1' where L1'>L1.

However, if the UE is configured to perform the reception/transmission of channel or CSI measurement in a last subslot within a subframe using RS1 (e.g. CRS) then the UE shall assume that N1=K1, while if the UE is configured to perform the reception/transmission of channel or CSI measurement in any subslot other than in the last subslot within a subframe using RS1 then N1=K1' where K1'>K1>L1'>L1.

The above example which defines an association between the location of the subslot in a subframe, type of RS used by the UE for one or more operations and the RS muting pattern used in cell1 is illustrated in Table 3. In this example the UE operation may comprise one or more of: channel reception, channel transmission and CSI measurements.

The UE may also be required to meet one or more requirements (e.g., performance requirements, demodulation requirements, accuracy requirements, etc.) when operating with the determined RS1 muting configuration.

TABLE 3

Number of WU subframes within RS muting pattern
in cell1 based on location of subslot in a subframe
and on the type of RS used for an operation

| RS muting pattern ID | Subslot location within a subframe configured for operation(s) in cell1 | Type of RS used by UE for operation in cell1 | Number of WU subframes (N1) in RS1 muting pattern |
|---|---|---|---|
| 0 | Subslot number = J | RS2 ≠ RS1 (different RS types) | L1 (e.g. L1 = 3) |
| 1 | Subslot number < J | RS2 ≠ RS1 (different RS types) | L1'; L1' > L1 (e.g. L' = 4) |
| 2 | Subslot number = J | RS2 = RS1 (same RS types) | K1 (e.g. K1 = 7) |

TABLE 3-continued

Number of WU subframes within RS muting pattern
in cell1 based on location of subslot in a subframe
and on the type of RS used for an operation

| RS muting pattern ID | Subslot location within a subframe configured for operation(s) in cell1 | Type of RS used by UE for operation in cell1 | Number of WU subframes (N1) in RS1 muting pattern |
|---|---|---|---|
| 3 | Subslot number < J | RS2 = RS1 (same RS types) | K1'; K1' > K1 > L1' (e.g. K1' = 8) |

Figure 11:
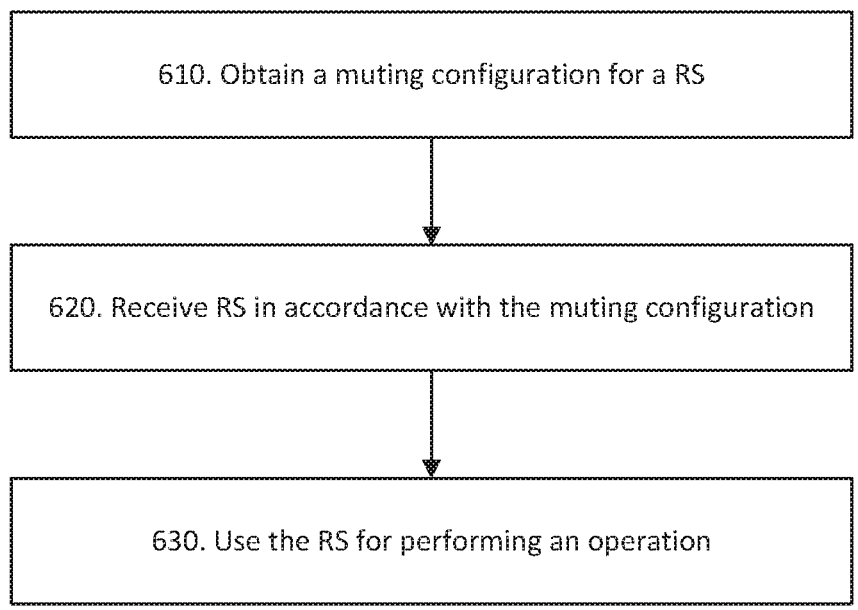
FIG. 11 is a flow chart illustrating a method which can be performed in a wireless device.

FIG. 11 is a flow chart illustrating a method which can be performed in a wireless device, such as UE 110. The UE can be served/managed by a network node transmitting at least one RS in a cell according to lean carrier operation. The method can include:

Step 610: Obtaining a muting configuration for a first RS. The muting configuration can be obtained from a network node or alternatively, can be obtained during UE configuration. In some embodiments, the muting configuration includes an indication of a number of warm-up and/or cool-down time resources. In some embodiments, the number of warm-up and/or cool-down time resources is determined in response to determining if the first RS is used for operating (e.g. transmitting, receiving) a channel by the UE. A first number of warm-up and/or cool-down time resources can be indicated responsive to determining that the first RS is used for operating the channel A second (e.g. different) number of warm-up and/or cool-down time resources can be indicated responsive to determining that a second RS is used for operating the channel. For example, the second RS can be used for operating the channel and the first RS can be used by the UE for another (e.g. preparatory-type) operation.

In some embodiments, the UE can determine a reference signal type (e.g. CRS, DMRS, CSI-RS, etc.) of at least one of the first RS and the second RS. The determined reference signal type can be used to further determine the configuration of the muting configuration associated with the first RS.

In some embodiments, the UE can determine a position of reception of the channel within a subframe. The determined position of reception of the channel in the subframe can be used to further determine the configuration of the muting configuration associated with the first RS.

Step 620: Receiving the first RS in accordance with the muting configuration. The RS can be transmitted by a network node.

Step 630: Using the first RS for performing at least one operation/operational task.

It will be appreciated that one or more of the above steps can be performed simultaneously and/or in a different order. Also, steps illustrated in dashed lines are optional and can be omitted in some embodiments.

Figure 12:
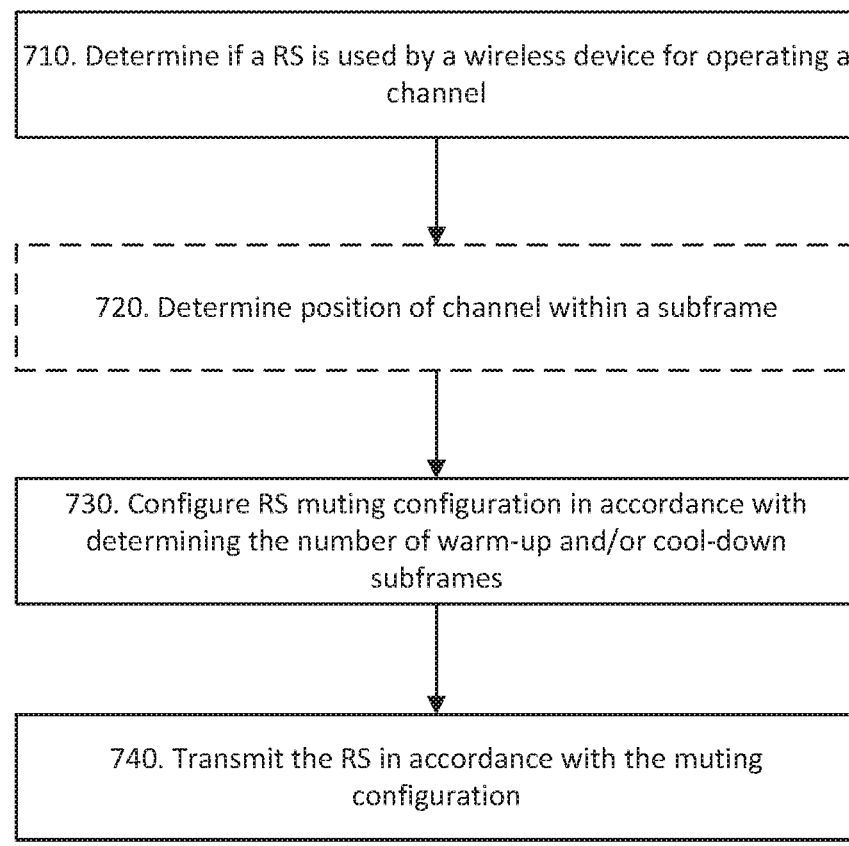
FIG. 12 is a flow chart illustrating a method which can be performed in a network node.

FIG. 12 is a flow chart illustrating a method which can be performed in a network node. In some embodiments, the network node can be a radio access node 120. The radio access node 120 can be an eNB or gNB as have been described herein. The network node can serve/manage a cell and transmit at least one RS according to lean carrier operation. The method can include:

Step 710: Determining if a first reference signal is used by a UE for operating (e.g. transmitting, receiving) a channel.

Step 720: (optional) Determining a position of reception of the channel within a subframe.

Step 730: Configuring a muting configuration for the first reference signal, including determining a number of warm-up and/or cool-down time resources. In some embodiments, the number of warm-up and/or cool-down time resources is determined in response to determining if the first RS is used for operating the channel by the UE. A first number of warm-up and/or cool-down time resources can be indicated responsive to determining that the first RS is used for operating the channel A second (e.g. different) number of warm-up and/or cool-down time resources can be indicated responsive to determining that a second RS is used for operating the channel. For example, the second RS can be used for operating the channel and the first RS can be used by the UE for another (e.g. preparatory-type) operation.

In some embodiments, the network node can further determine a reference signal type (e.g. CRS, DMRS, CSI-RS, etc.) of at least one of the first RS and/or the second RS. The determined reference signal type can be used to further determine the configuration of the muting configuration associated with the first RS.

In some embodiments, the determined position of reception of the channel in the subframe can be used to further determine the configuration of the muting configuration associated with the first RS. As non-limiting examples, responsive to determining the position of reception of the channel is in a later part of the subframe, the network node can decrease the number of warm-up time resources. Responsive to determining the position of reception of the channel is in an earlier part of the subframe, the network node can increase the number of warm-up time resources. Responsive to determining the position of reception of the channel is in a later part of the subframe, the network node can increase the number of cool-down time resources. Responsive to determining the position of reception of the channel is in an earlier part of the subframe, the network node can decrease the number of cool-down time resources.

Step 740: Transmitting the first RS in accordance with the configured muting configuration.

It will be appreciated that one or more of the above steps can be performed simultaneously and/or in a different order. Also, steps illustrated in dashed lines are optional and can be omitted in some embodiments.

Some embodiments described herein can reduce the CRS signal overheads in the network and/or reduce interference due to CRS in the network. In some embodiments, the radio resources (e.g. subframes, RBs, etc.) in the network can be used more efficiently since overheads due to CRS are reduced. For example, the resources can be allocated to other users. Further, the system capacity can be increased. For example, a larger number of UEs can be served by a cell due to reduction in overheads and interference.

Figure 13:
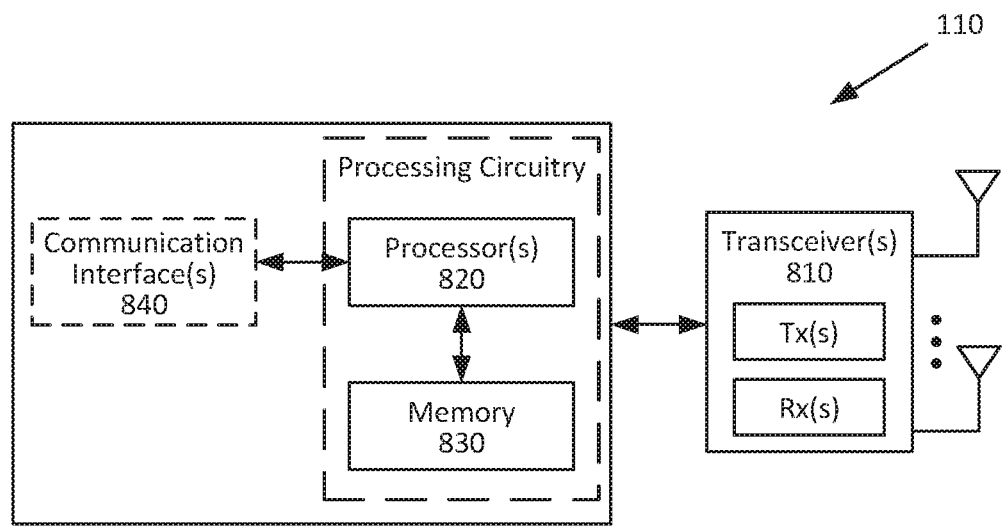
FIG. 13 is a block diagram of an example wireless device.

FIG. 13 is a block diagram of an example wireless device, UE 110, in accordance with certain embodiments. UE 110 includes a transceiver 810, processor 820, and memory 830. In some embodiments, the transceiver 810 facilitates transmitting wireless signals to and receiving wireless signals from radio access node 120 (e.g., via transmitter(s) (Tx), receiver(s) (Rx) and antenna(s)). The processor 820 executes instructions to provide some or all of the functionalities described above as being provided by UE, and the memory 830 stores the instructions executed by the processor 820. In some embodiments, the processor 820 and the memory 830 form processing circuitry.

The processor 820 can include any suitable combination of hardware to execute instructions and manipulate data to perform some or all of the described functions of a wireless device, such as the functions of UE 110 described above. In some embodiments, the processor 820 may include, for example, one or more computers, one or more central processing units (CPUs), one or more microprocessors, one or more application specific integrated circuits (ASICs), one or more field programmable gate arrays (FPGAs) and/or other logic.

The memory 830 is generally operable to store instructions, such as a computer program, software, an application including one or more of logic, rules, algorithms, code, tables, etc. and/or other instructions capable of being executed by a processor 820. Examples of memory 830 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information, data, and/or instructions that may be used by the processor 820 of UE 110.

Other embodiments of UE 110 may include additional components beyond those shown in FIG. 13 that may be responsible for providing certain aspects of the wireless device's functionalities, including any of the functionalities described above and/or any additional functionalities (including any functionality necessary to support the solution described above). As just one example, UE 110 may include input devices and circuits, output devices, and one or more synchronization units or circuits, which may be part of the processor 820. Input devices include mechanisms for entry of data into UE 110. For example, input devices may include input mechanisms, such as a microphone, input elements, a display, etc. Output devices may include mechanisms for outputting data in audio, video and/or hard copy format. For example, output devices may include a speaker, a display, etc.

Figure 14:
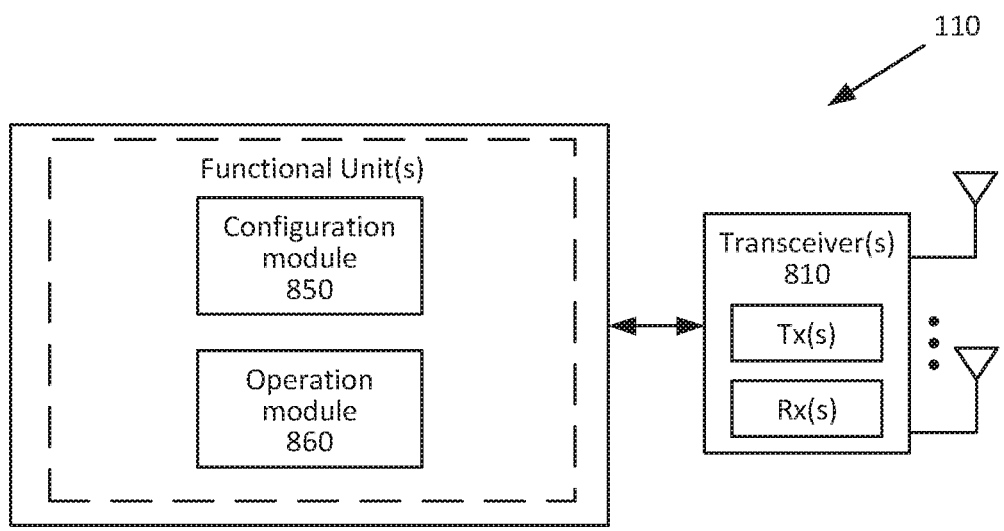
FIG. 14 is a block diagram of an example wireless device with modules.

In some embodiments, the wireless device UE 110 may comprise a series of modules configured to implement the functionalities of the wireless device described above. Referring to FIG. 14, in some embodiments, the wireless device 110 may comprise a configuration module 850 for determining a RS muting configuration and an operation module 860 for performing an operation using the RS muting configuration.

It will be appreciated that the various modules may be implemented as combination of hardware and software, for instance, the processor, memory and transceiver(s) of UE 110 shown in FIG. 13. Some embodiments may also include additional modules to support additional and/or optional functionalities.

Figure 15:
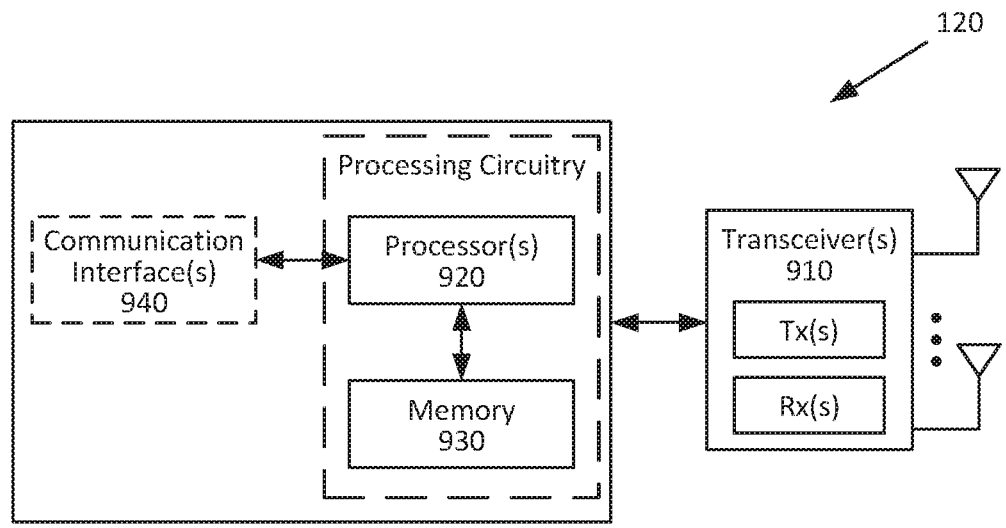
FIG. 15 is a block diagram of an example network node.

FIG. 15 is a block diagram of an exemplary network node 120, in accordance with certain embodiments. In some embodiments, the network node 120 can be a radio access node 120. The radio access node 120 can be an eNB or gNB as have been described herein.

Network node 120 can include one or more of a transceiver 910, processor 920, memory 930, and network interface 940. In some embodiments, the transceiver 910 facilitates transmitting wireless signals to and receiving wireless signals from wireless devices, such as UE 110 (e.g., via transmitter(s) (Tx), receiver(s) (Rx), and antenna(s)). The processor 920 executes instructions to provide some or all of the functionalities described above as being provided by a radio access node 120, the memory 930 stores the instructions executed by the processor 920. In some embodiments, the processor 920 and the memory 930 form processing circuitry. The network interface 940 can communicate signals to backend network components, such as a gateway, switch, router, Internet, Public Switched Telephone Network (PSTN), core network nodes or radio network controllers, etc.

The processor 920 can include any suitable combination of hardware to execute instructions and manipulate data to perform some or all of the described functions of network node 120/130, such as those described above. In some embodiments, the processor 920 may include, for example, one or more computers, one or more central processing units (CPUs), one or more microprocessors, one or more application specific integrated circuits (ASICs), one or more field programmable gate arrays (FPGAs) and/or other logic.

The memory 930 is generally operable to store instructions, such as a computer program, software, an application including one or more of logic, rules, algorithms, code, tables, etc. and/or other instructions capable of being executed by a processor 920. Examples of memory 930 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, the network interface 940 is communicatively coupled to the processor 920 and may refer to any suitable device operable to receive input for network node 120, send output from node 120, perform suitable processing of the input or output or both, communicate to other devices, or any combination of the preceding. The network interface 940 may include appropriate hardware (e.g., port, modem, network interface card, etc.) and software, including protocol conversion and data processing capabilities, to communicate through a network.

Other embodiments of network node 120 can include additional components beyond those shown in FIG. 15 that may be responsible for providing certain aspects of the node's functionalities, including any of the functionalities described above and/or any additional functionalities (including any functionality necessary to support the solutions described above). The various different types of network nodes may include components having the same physical hardware but configured (e.g., via programming) to support different radio access technologies, or may represent partly or entirely different physical components.

Processors, interfaces, and memory similar to those described with respect to FIGS. 13 and 15 may be included in other network nodes. Other network nodes may optionally include or not include a wireless interface (such as the transceiver described in FIGS. 13 and 15).

Figure 16:
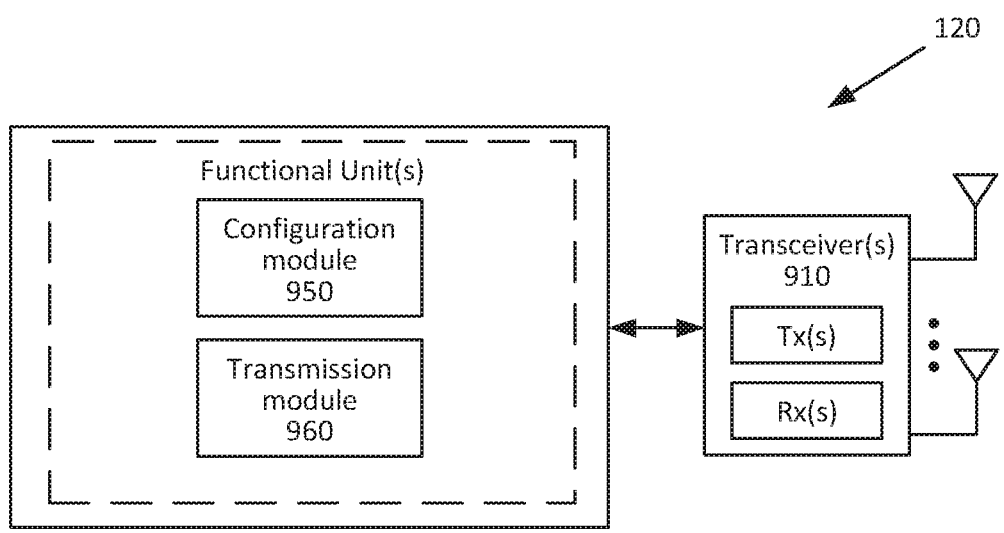
FIG. 16 is a block diagram of an example network node with modules.

In some embodiments, the network node 120, may comprise a series of modules configured to implement the functionalities of the network node described above. Referring to FIG. 16, in some embodiments, network node 120 can comprise a configuration module 950 for determining a RS muting configuration a transmission module 960 for transmitting at least a first RS in accordance with the RS muting configuration.

It will be appreciated that the various modules may be implemented as combination of hardware and software, for instance, the processor, memory and transceiver(s) of network node 120 shown in FIG. 15. Some embodiments may also include additional modules to support additional and/or optional functionalities.

Some embodiments may be represented as a software product stored in a machine-readable medium (also referred to as a computer-readable medium, a processor-readable medium, or a computer usable medium having a computer readable program code embodied therein). The machine-readable medium may be any suitable tangible medium including a magnetic, optical, or electrical storage medium including a diskette, compact disk read only memory (CD-ROM), digital versatile disc read only memory (DVD-ROM) memory device (volatile or non-volatile), or similar storage mechanism. The machine-readable medium may contain various sets of instructions, code sequences, configuration information, or other data, which, when executed, cause processing circuitry (e.g. a processor) to perform steps in a method according to one or more embodiments. Those of ordinary skill in the art will appreciate that other instructions and operations necessary to implement the described embodiments may also be stored on the machine-readable medium. Software running from the machine-readable medium may interface with circuitry to perform the described tasks.

The above-described embodiments are intended to be examples only. Alterations, modifications and variations may be effected to the particular embodiments by those of skill in the art without departing from the scope of the description.

Examples of Standarization Scenarios

Applicability of Requirements for UE Capable of Network-Based CRS Interference Mitigation If network-based CRS interference mitigation is enabled in a cell, then the UE capable of network-based CRS interference mitigation can assume that:

- CRS is transmitted over full bandwidth of the cell during active time periods (T1) and over at least 6 central resource blocks of the cell during the inactive time periods (T2), and
- CRS is transmitted over full bandwidth of the cell during at least N1 number of non-MBSFN non-special DL subframes immediately before the T1 time period, and
- CRS is transmitted over full bandwidth of the cell during at least N2 number of DL subframes after the T1 time period when UE receives the downlink physical channel during the T1 time period, and
- The active time period T1 at least includes any period of the time where
- UE monitors/receives the downlink physical channels including PDCCH, EPDCCH, MPDCCH, PDSCH, PMCH, PCFICH, PHICH, or
- UE receives the downlink physical signals including CRS, DM-RS, NZP CSI-RS, MBSFN-RS, and PRS, or
- UE transmits the uplink physical channels including PUCCH, SPUCCH, PUSCH, SPUSCH, and PRACH, or
- UE transmits the uplink physical signals including DM-RS and SRS.

The values of the parameters T1, T2, N1 and N2 are specified for relevant requirements in their corresponding sections. The inactive time periods T2 shall not contain any subframe where the UE requires CRS over the full cell bandwidth for any purpose to meet the requirements in this specification. Unless stated otherwise the requirements in this section are defined under the assumption that the UE is configured to demodulate any of the downlink channels based on CRS.

UE can additionally assume the following active time period T1 after the PRACH transmission:

- for UE performing random access, the time from the start of RAR window until MSG2 and MSG4 is received and DRX is configured.
- for UE transmitting PRACH due to handover, the time from the start of RAR window until the handover/RRC connection reconfiguration is complete;
- for UE transmitting a scheduling request over PRACH, the time from the start of RAR window until MSG2 is received.

For a UE capable of supporting dual connectivity and/or carrier aggregation, UE can additionally assume that no inactive time period T2 is present in any of its serving cell(s) in the following period of the time:

- the time from receiving the PSCell addition command until UE starts the PSCell release period,
- the time from receiving of SCell activation command until UE starts the SCell deactivation period,
- the time from receiving of SCell configuration command until UE sends RRCConnectionReconfigurationComplete.

For UE in RRC IDLE and configured with eDRX IDLE, UE shall assume that inactive time periods T2 comprises any subframe that is outside PTW which is not comprised in the N1 and N2 number of DL subframe before and after any active time period T1 within PTW.

For measurements on neighbor cells that is indicated by the high layer to support the network-based CRS interference mitigation,

- if the UE is configured with widebandRSRQ-Meas to measure WB-RSRQ then the UE shall assume that CRS are available in the measured cell over the Allowed-MeasBandwidth,
- otherwise the UE shall assume the AllowedMeasBandwidth is 6 RBs and inactive time periods T2 may be used in a neighbor cell.

If network-based CRS interference mitigation is enabled in a cell, all the requirements in this specification shall be met for UE capable of network-based CRS interference mitigation, provided that N1=[8] and N2=[1], with the following additional conditions that:

- for UE configured with DRX or eDRX_CONN, the active time periods T1 also includes the periods where no DRX is used (see Section 5 for the definition of the no DRX used state) by the UE, preceded by N1 and followed by N2;
- for UE operating in HD-FDD mode, provided CRS are available in the concerned cell during UL gaps [16] occurring during the UE's UL transmission, with N1=N2=0 subframes before and after the UL gaps [16] occurring during the UE's UL transmission which are comprised in the active time periods T1 within the UE bandwidth;
- for UE monitoring or receiving paging, the active time periods T1 also includes all configured paging occasions, with N1=[8] and N2=1 subframes before and after each paging occasion respectively;
- for UE in RRC IDLE and RRC CONNECTED and receiving SIB1 or SIB1-BR, the active time periods T1 also includes all subframes with SIB1, where N1=[8] and N2=1 subframes;
- for UE receiving NRS signals [16], provided CRS are available in the concerned cell in all NRS subframes configured for the UE which are comprised in the active time periods T1 within the UE bandwidth, with N1=N2=0 subframes before and after the NRS subframes which is not comprised in the N1 and N2 number of DL subframe before and after any other active time period T1;
- for UE monitoring/receiving PRS, the active time periods T1 also includes all PRS subframes, where N2=0 subframes which is not comprised in the N1 and N2 number of DL subframe before and after any other active time period T1;

for UE monitoring SPDCCH in the last subslot of a subframe or receiving PDSCH in the last subslot of a subframe, the subframe is comprised in the active time period T1 and preceded by N1=7 subframes;

for UE transmitting SPUCCH or PUSCH in the last subslot of a subframe, the subframe is comprised in the active time period T1 and preceded by N1=7 subframes;

for UE configured to use other reference signal than CRS for demodulation of a channel, the active time periods T1 also include the reception of this channel, with N1=4 subframes and N2=0 subframes before and after receiving this channel, respectively;

for UE configured to use other reference signal than CRS for demodulation of a channel monitored or received in the last subslot of a subframe, the active time periods T1 also include the reception of this channel, with N1=3 subframes and N2=0 subframes before and after receiving this channel, respectively.

Short TTI is a feature enabling a shortening of the LTE round trip time. The Short TTI feature consists of three main components:

The introduction of transmissions shorter than one subframe in PDSCH and PUSCH,

The introduction of new short in-band DL control (SPDCCH) and new short UL control (SPUCCH), The reduction of processing time and related procedures (e.g., HARQ).

Short physical downlink control channel (SPDCCH) is used to schedule the slot-based/subslot-based PDSCH. Two TTI configurations for PDSCH have been standardized: TTI configuration for 7 OFDM symbols (or slot-based PDSCH) and TTI configuration for 2/3 OFDM symbols (or subslot-based PDSCH).

Furthermore, SPDCCH uses CRS or DMRS as demodulation reference symbols, configured by the RRC parameter spdcch-SetReferenceSig={crs, dmrs}. Depending on whether it is the CRS-based or DMRS-based, the number of configurable OFDM symbols used for SPDCCH are different. This also determines whether CRS or DMRS are used for PDSCH demodulation.

Observation 1: When sTTI carrying SPDCCH, SPUCCH, subslot-based PDSCH, or subslot-based PUSCH occurs e.g. in the last subslot of a subframe, the UE requires fewer warm-up subframes.

Observation 2: When DMRS are used for demodulation, the number of required warm-up subframes carrying CRS is smaller.

Based on these observations, the following is proposed for sTTI:

Proposal 1: For UE receiving SPDCCH or PDSCH or transmitting SPUCCH or PUSCH in the last subslot of a subframe, N1=7 subframes.

Proposal 2: For UE configured to use other reference signal than CRS for demodulation of a channel, N1=4 subframes and N2=0 subframes before and after receiving this channel, respectively.

Proposal 3: For UE configured to use other reference signal than CRS for demodulation of a channel received in the last subslot of a subframe, N1=3 subframes and N2=0 subframes before and after receiving this channel, respectively.

Glossary

The present description may comprise one or more of the following abbreviation:

3GPP Third Generation Partnership Project
ACK Acknowledgement
AP Access point
ARQ Automatic Repeat Request
BS Base Station
BSC Base station controller
BTS Base transceiver station
CA Carrier Aggregation
CC Component carrier
CCCH SDU Common Control Channel SDU
CG Cell group
CGI Cell Global Identifier
CQI Channel Quality information
CSI Channel State Information
DAS Distributed antenna system
DC Dual connectivity
DCCH Dedicated Control Channel
DCI Downlink Control Information
DL Downlink
DMRS Demodulation Reference Signal
eMBB Enhanced Mobile Broadband
eNB E-UTRAN NodeB or evolved NodeB
ePDCCH enhanced Physical Downlink Control Channel
E-SMLC evolved Serving Mobile Location Center
E-UTRA Evolved UTRA
E-UTRAN Evolved UTRAN
FDM Frequency Division Multiplexing
HARQ Hybrid Automatic Repeat Request
HO Handover
IoT Internet of Things
LTE Long-Term Evolution
M2M Machine to Machine
MAC Medium Access Control
MBMS Multimedia Broadcast Multicast Services
MCG Master cell group
MDT Minimization of Drive Tests
MeNB Master eNode B
MME Mobility Management Entity
MSC Mobile Switching Center
MSR Multi-standard Radio
MTC Machine Type Communication
NACK Negative acknowledgement
NDI Next Data Indicator
NR New Radio
O&M Operation and Maintenance
OFDM Orthogonal Frequency Division Multiplexing
OFDMA Orthogonal Frequency Division Multiple Access
OSS Operations Support System
PCC Primary Component Carrier
P-CCPCH Primary Common Control Physical Channel
PCell Primary Cell
PCG Primary Cell Group
PCH Paging Channel
PCI Physical Cell Identity
PDCCH Physical Downlink Control Channel
PDSCH Physical Downlink Shared Channel
PDU Protocol Data Unit
PGW Packet Gateway
PHICH Physical HARQ indication channel
PMI Precoder Matrix Indicator
ProSe Proximity Service
PSC Primary serving cell
PSCell Primary SCell PUCCH Physical Uplink Control Channel
PUSCH Physical Uplink Shared Channel
RAT Radio Access Technology
RB Resource Block
RF Radio Frequency
RLM Radio Link Management
RNC Radio Network Controller
RRC Radio Resource Control
RRH Remote Radio Head
RRM Radio Resource Management
RRU Remote Radio Unit
RSRP Reference Signal Received Power
RSRQ Reference Signal Received Quality
RSSI Received Signal Strength Indicator
RSTD Reference Signal Time Difference
RTT Round Trip Time
SCC Secondary Component Carrier
SCell Secondary Cell
SCG Secondary Cell Group
SCH Synchronization Channel
SDU Service Data Unit
SeNB Secondary eNodeB
SGW Serving Gateway
SI System Information
SIB System Information Block
SINR Signal to Interference and Noise Ratio
SNR Signal Noise Ratio
SPS Semi-persistent Scheduling
SON Self-organizing Network
SR Scheduling Request
SRS Sounding Reference Signal
SSC Secondary Serving Cell
TTI Transmission Time Interval
Tx Transmitter
UE User Equipment
UL Uplink
URLLC Ultra-Reliable Low Latency Communication
UTRA Universal Terrestrial Radio Access
UTRAN Universal Terrestrial Radio Access Network
V2V Vehicle-to-vehicle
V2X Vehicle-to-everything
WLAN Wireless Local Area Network

The invention claimed is:

1. A method performed by a network node, comprising:
determining if a first reference signal is used by a wireless device for operating a channel;
configuring a muting configuration for the first reference signal, including one of:
 determining a first number of at least one of warm-up and cool-down time resources responsive to determining that the first reference signal is used for operating the channel, and
 determining a second number of at least one of warm-up and cool-down time resources responsive to determining that a second reference signal is used for operating the channel;
 wherein determining the number of the at least one of warm-up and cool-down time resources is in accordance with a position of reception of the channel within a time resource; and
transmitting the first reference signal in accordance with the configured muting configuration.

2. The method of claim 1, further comprising, determining a reference signal type of the first reference signal.

3. The method of claim 2, wherein the reference signal type is one of Cell-specific Reference Signal (CRS), Demodulation Reference Signal (DMRS), and Channel State Information Reference Signal (CSI-RS).

4. The method of claim 1, further comprising, determining a reference signal type of the second reference signal.

5. The method of claim 1, further comprising, configuring a second muting configuration for the first reference signal responsive to determining that the first reference signal is used for a preparatory operation associated with the channel.

6. The method of claim 1, further comprising, responsive to determining the position of reception of the channel is in a later part of the time resource, decreasing the number of warm-up time resources.

7. The method of claim 1, further comprising, responsive to determining the position of reception of the channel is in a later part of the time resource, increasing the number of cool-down time resources.

8. The method of claim 1, further comprising, responsive to determining the position of reception of the channel is in an earlier part of the time resource, increasing the number of warm-up time resources.

9. The method of claim 1, further comprising, responsive to determining the position of reception of the channel is in an earlier part of the time resource, decreasing the number of cool-down time resources.

10. A network node comprising a radio interface and processing circuitry configured to:
determine if a first reference signal is used by a wireless device for operating a channel;
configure a muting configuration for the first reference signal, including one of:
 determine a first number of at least one of warm-up and cool-down time resources responsive to determining that the first reference signal is used for operating the channel, and
 determine a second number of at least one of warm-up and cool-down time resources responsive to determining that a second reference signal is used for operating the channel;
 wherein determining the number of the at least one of warm-up and cool-down time resources is in accordance with a position of reception of the channel within a time resource; and
transmit the first reference signal in accordance with the configured muting configuration.

11. The network node of claim 10, further configured to determine a reference signal type of the first reference signal.

12. The network node of claim 11, wherein the reference signal type is one of Cell-specific Reference Signal (CRS), Demodulation Reference Signal (DMRS), and Channel State Information Reference Signal (CSI-RS).

13. The network node of claim 10, further configured to determine a reference signal type of the second reference signal.

14. The network node claim 10, further configured to configure a second muting configuration for the first reference signal responsive to determining that the first reference signal is used for a preparatory operation associated with the channel.

15. The network node of claim 10, further configured to, responsive to determining the position of reception of the channel is in a later part of the time resource, decrease the number of warm-up time resources.

16. The network node of claim 10, further configured to, responsive to determining the position of reception of the channel is in a later part of the time resource, increase the number of cool-down time resources.

17. The network node of claim 10, further configured to, responsive to determining the position of reception of the channel is in an earlier part of the time resource, increase the number of warm-up time resources.

18. The network node of claim 10, further configured to, responsive to determining the position of reception of the channel is in an earlier part of the time resource, decrease the number of cool-down time resources.

19. A method performed by a wireless device, comprising:
obtaining a muting configuration for a first reference signal, the muting configuration including an indication of one of:
a first number of at least one of warm-up and cool-down time resources responsive to determining that the first reference signal is used for operating a channel, and
a second number of at least one of warm-up and cool-down time resources responsive to determining that a second reference signal is used for operating the channel;
determining a position of reception of the channel within a time resource and further configuring the muting configuration in accordance with the determined position of reception of the channel with the time resource;
receiving the first reference signal in accordance with the muting configuration; and
using the first reference signal for performing at least one operation.

20. The method of claim 19, further comprising, determining a reference signal type of at least one of the first reference signal and the second reference signal.

21. The method of claim 20, wherein the muting configuration is further configured in accordance with the determined reference signal type.

22. A wireless device comprising a radio interface and processing circuitry configured to:
obtain a muting configuration for a first reference signal, the muting configuration including an indication of one of:
a first number of at least one of warm-up and cool-down time resources responsive to determining that the first reference signal is used for operating the channel, and
a second number of at least one of warm-up and cool-down time resources responsive to determining that a second reference signal is used for operating the channel;
determine a position of reception of the channel within a time resource and further configuring the muting configuration in accordance with the determined position of reception of the channel with the time resource;
receive the first reference signal in accordance with the muting configuration; and
use the first reference signal for performing at least one operation.

23. The wireless device of claim 22, further configured to determine a reference signal type of at least one of the first reference signal and the second reference signal.

24. The wireless device of claim 23, wherein the muting configuration is further configured in accordance with the determined reference signal type.

* * * * *

UNITED STATES PATENT AND TRADEMARK OFFICE
CERTIFICATE OF CORRECTION

| | |
|---|---|
| PATENT NO. | : 11,838,175 B2 |
| APPLICATION NO. | : 17/290464 |
| DATED | : December 5, 2023 |
| INVENTOR(S) | : Siomina et al. |

It is certified that error appears in the above-identified patent and that said Letters Patent is hereby corrected as shown below:

On the Title Page

In Item (72), under "Inventors", in Column 1, Line 3, delete "Kawasaki Kanagawa" and insert -- Kawasaki, Kanagawa --, therefor.

In the Drawings

In Fig. 8, Sheet 9 of 15, for Tag "430", Line 1, delete "and/or- cool down" and insert -- and/or cool-down --, therefor.

In the Specification

In Column 1, Line 8, delete "2019" and insert -- 2018 --, therefor.

In Column 1, Line 10, delete "2019," and insert -- 2018, --, therefor.

In Column 2, Line 51, delete "information how" and insert -- information on how --, therefor.

In Column 3, Line 48, delete "where" and insert -- when --, therefor.

In Column 5, Line 32, delete "a examples" and insert -- an example --, therefor.

In Column 5, Line 42, delete "example" and insert -- an example of --, therefor.

In Column 6, Line 28, delete "equipped" and insert -- equipment --, therefor.

In Column 6, Line 53, delete "narrow band" and insert -- narrowband --, therefor.

In Column 7, Line 43, delete "in in" and insert -- in --, therefor.

Signed and Sealed this
Eleventh Day of February, 2025

Coke Morgan Stewart
*Acting Director of the United States Patent and Trademark Office*

CERTIFICATE OF CORRECTION (continued)
U.S. Pat. No. 11,838,175 B2

In Column 7, Line 51, delete "a like)," and insert -- alike), --, therefor.

In Column 7, Line 55, delete "directly" and insert -- directed --, therefor.

In Column 11, Line 64, delete "while also" and insert -- while --, therefor.

In Column 13, Line 64, delete "least" and insert -- at least --, therefor.

In Column 14, Line 12, delete "channel" and insert -- channel. --, therefor.

In Column 16, Line 32, delete "DCI in sTTI index #0 is transmitted with PDCCH." and insert the same on Line 31 after "Note 1:", as a continuation sub-point.

In Column 17, Line 36, delete "channel" and insert -- channel. --, therefor.

In Column 18, Line 61, delete "#1, J," and insert -- #1, ...., J, --, therefor.

In Column 20, Line 18, delete "DM-RS)" and insert -- DM-RS). --, therefor.

In Column 21, Line 32, delete "channel" and insert -- channel. --, therefor.

In Column 22, Line 9, delete "channel" and insert -- channel. --, therefor.

In Column 23, Line 16, delete "and/or or" and insert -- and/or --, therefor.

In Column 24, Line 23, delete "and/or or" and insert -- and/or --, therefor.

In Column 25, Line 25, delete "Standarization" and insert -- Standardization --, therefor.

In Column 25, Line 43, delete "where" and insert -- where, --, therefor.

In Column 27, Line 42, delete "{crs,    dmrs}." and insert -- {crs, dmrs}. --, therefor.

In Column 28, Line 17, delete "information" and insert -- Indicator --, therefor.

In Column 28, Line 62, delete "Packet Gateway" and insert -- Packet Data Network Gateway --, therefor.

In the Claims

In Column 30, Line 55, in Claim 14, delete "node" and insert -- node of --, therefor.